United States Patent

Kuroki

[11] Patent Number: 6,002,304
[45] Date of Patent: Dec. 14, 1999

[54] DATA MODULATION SYSTEM USING DIGITAL SIGNAL PROCESSING

[75] Inventor: Satoshi Kuroki, Fukuoka, Japan

[73] Assignee: Fujitsu Limited, Kanagawa, Japan

[21] Appl. No.: 09/066,114

[22] Filed: Apr. 23, 1998

[30] Foreign Application Priority Data

Oct. 6, 1997 [JP] Japan ................................ 9-272292

[51] Int. Cl.⁶ ............................................... H04L 27/12
[52] U.S. Cl. ...................... 332/100; 332/101; 375/272; 375/303
[58] Field of Search .................................. 332/100, 101, 332/103, 104; 375/272, 274, 279, 303, 305, 308

[56] References Cited

U.S. PATENT DOCUMENTS

| | | | |
|---|---|---|---|
| 3,958,191 | 5/1976 | Jones, Jr. ................................ | 332/100 |
| 4,757,519 | 7/1988 | Collison et al. ........................ | 332/101 |
| 5,406,584 | 4/1995 | Erisman ................................... | 332/100 |

*Primary Examiner*—Siegfried H. Grimm
*Attorney, Agent, or Firm*—Helfgott & Karas, P.C.

[57] ABSTRACT

A modulation system is provided with a data analyzer detecting input of a modulated data and a modulation clock signal and latching and detecting an edge of the modulated data, in response to the modulated data and the modulation clock signal, a signal controller, responsive to an output of the data analyzer, carrying out an operation process with respect to the frequency deviation data and carrying out one of a frequency deviation amplitude control operation and a frequency deviation time control operation, a digital-to-analog converter converting an output of the signal controller into an analog signal, and a transmitting unit transmitting an output of the digital-to-analog converter.

10 Claims, 30 Drawing Sheets

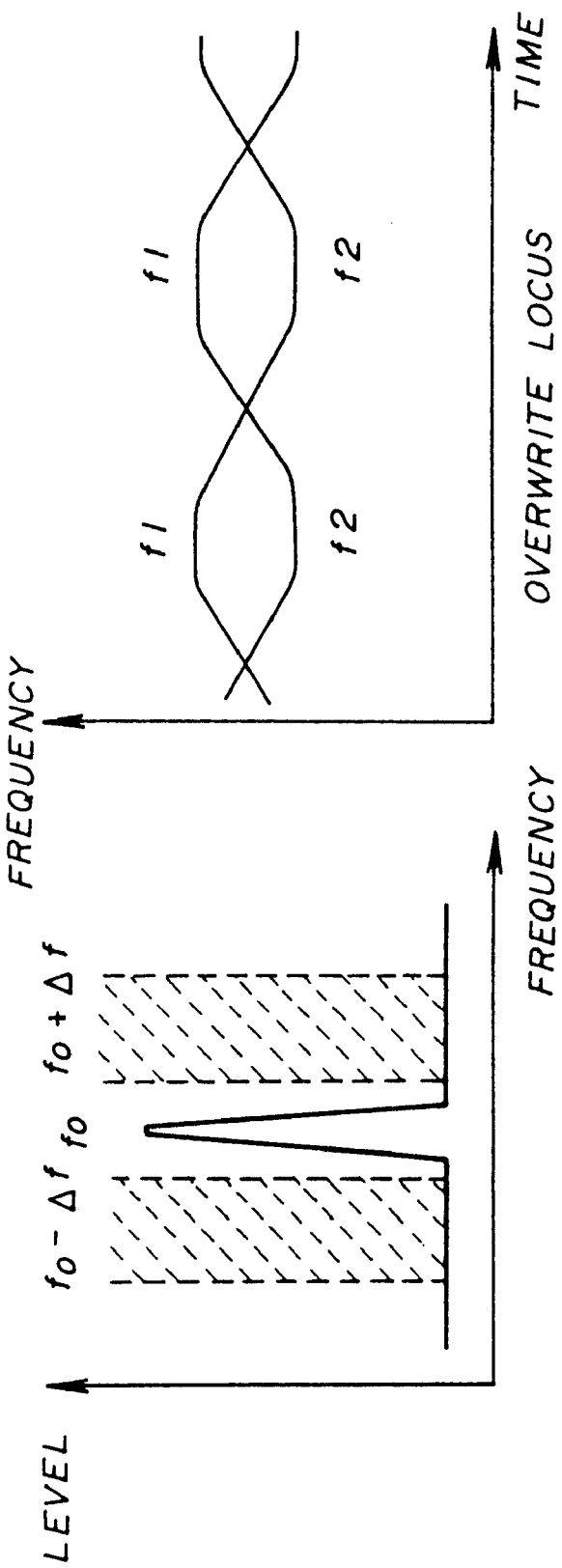

MODULATED DATA HAVING SHORT PERIOD

MODULATED DATA HAVING SINGLE CHANGE

MODULATED DATA HAVING LONG PERIOD

FIG. 6

| FREQUENCY DEVIATION CONDITION | DEMODULATION STABILITY FOR LARGE FREQUENCY DEVIATION | DEMODULATION STABILITY FOR SMALL FREQUENCY DEVIATION | LEAKAGE POWER TO ADJACENT CHANNEL |
|---|---|---|---|
| DEVIATION POINT SUITED FOR LARGE FREQUENCY DEVIATION | ○ | ◎ | × |
| DEVIATION POINT SUITED FOR SMALL FREQUENCY DEVIATION | × | ○ | ◎ |
| OPTIMIZED FOR LARGE & SMALL FREQUENCY DEVIATION | ○ | ○ | ○ |

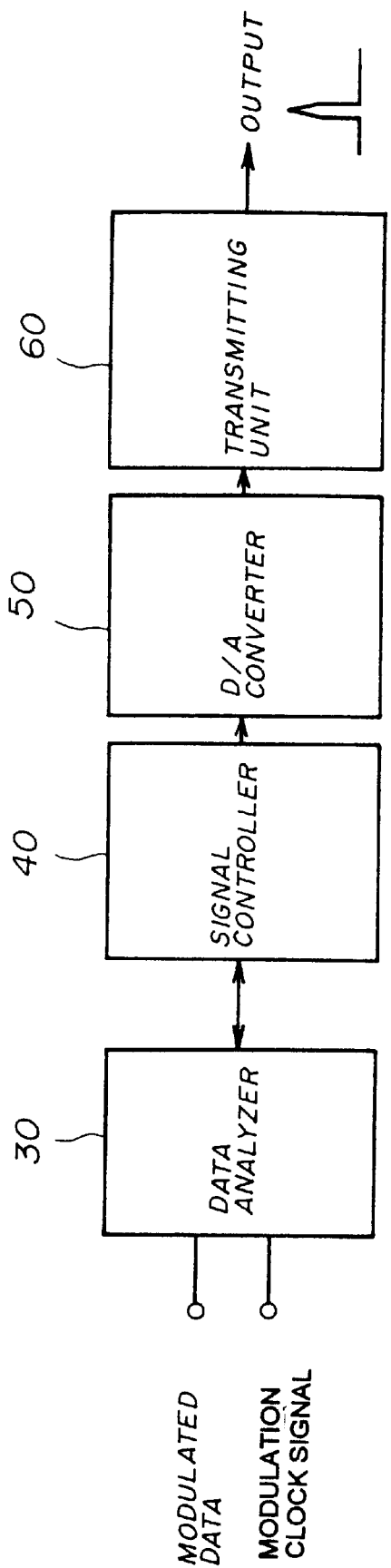

FIG. 10

| FREQUENCY DEVIATION CONDITION | DEMODULATION STABILITY FOR LARGE FREQUENCY DEVIATION | DEMODULATION STABILITY FOR SMALL FREQUENCY DEVIATION | LEAKAGE POWER TO ADJACENT CHANNEL |
|---|---|---|---|
| SUIT SMALL FREQUENCY DEVIATION TO f2 | ○ | ○ | ○ |

FIG. 12

| FREQUENCY DEVIATION CONDITION | DEMODULATION STABILITY FOR LARGE FREQUENCY DEVIATION | DEMODULATION STABILITY FOR SMALL FREQUENCY DEVIATION | LEAKAGE POWER TO ADJACENT CHANNEL |
|---|---|---|---|
| MATCH LARGE FREQUENCY DEVIATION TO t3, SMALL FREQUENCY DEVIATION TO t2 | ◎ | ○ | ○ |

FIG. 14

| FREQUENCY DEVIATION CONDITION | DEMODULATION STABILITY FOR LARGE FREQUENCY DEVIATION | DEMODULATION STABILITY FOR SMALL FREQUENCY DEVIATION | LEAKAGE POWER TO ADJACENT CHANNEL |
|---|---|---|---|
| CONTROL FREQUENCY DEVIATION WIDTH | ◎ | ◎ | ○ |

FIG. 20

| MODULATED DATA | | POINTER |
|---|---|---|
| M | L | |
| 1 | 0 | 3 |
| 1 | 1 | 2 |
| 0 | 1 | 1 |
| 0 | 0 | 0 |

DATA MODULATION SYSTEM USING DIGITAL SIGNAL PROCESSING

BACKGROUND OF THE INVENTION

The present invention generally relates to modulation systems used in radio communications, and more particularly to a modulation system which is applicable to a data transmission of a communication system using a frequency shift keying (FSK) modulation technique and carries out a modulation of a binary value or greater using the FSK modulation technique.

One of the problems associated with a transmission characteristic of the radio communication is a leakage power to an adjacent channel. This leakage power to the adjacent channel refers to the power which leaks to the adjacent channel during the data transmission. If the leakage power to the adjacent channel is outside a range of a standard value, undesirable effects are introduced by the leakage power which acts as an interference wave with respect to other channels. For this reason, the band must be limited so as to transmit only the desired frequencies.

In a transmitter which makes the data transmission, a high-frequency component is eliminated by use of a lowpass filter or the like, and a frequency deviation is changed slowly or smoothly, so as to satisfy the above described standard.

FIGS. 1A and 1B respectively are diagrams for explaining the slow frequency deviation. More particularly, FIG. 1A shows a frequency versus level characteristic, and FIG. 1B shows a time versus frequency characteristic. In FIG. 1A, the ordinate indicates the level and the abscissa indicates the frequency. On the other hand, in FIG. 1B, the ordinate indicates the frequency and the abscissa indicates the time.

In FIG. 1A, f0 indicates a modulated wave (carrier frequency), and f0+Δf and f0−Δf indicate adjacent channels. In the case of a binary FSK modulation, the modulation is carried out by making f1 correspond to "1" and f2 correspond to "0", for example. Accordingly, in the case of the adjacent channels shown in FIG. 1A, the channels on both sides are completely separated from the modulated wave.

FIG. 1B is a diagram showing an overwrite locus, and a frequency deviation from f1 to f2 and a frequency deviation from f2 to f2 are smooth. In the case of such a slow frequency deviation, the leakage power to the adjacent channel is uneasily generated.

On the other hand, in the case of a fast frequency deviation, the modulated wave f0 enters into the adjacent region as shown in FIG. 2A, and the leakage power to the adjacent channel is generated. FIG. 2B shows a time versus frequency characteristic for the case shown in FIG. 2A. In this case, the leakage power becomes an interference wave with respect to the adjacent channel and causes undesirable effects when the leakage power becomes outside the range of the standard value.

On the other hand, in a receiver which receives the data transmission, it is possible to carry out a more stable demodulation if the frequency deviation is faster (ideally a square wave). Therefore, there is a demand to satisfy the standard of the leakage power to the adjacent channel and at the same time satisfy a frequency deviation advantageous to the receiver.

There are various methods of limiting the band in the radio communication, as described in the following.

A base band filtering method smoothens the modulated data by use of a lowpass filter.

A radio frequency (RF) filtering method uses a bandpass filter to pass only the necessary transmitting frequencies.

A digital signal processor (DSP) filtering method calculates a signal passed through a lowpass filter from the demodulated data.

A DSP direct modulation method outputs a signal which is modulated into an intermediate frequency from the modulated data.

FIGS. 3A through 3C are diagrams for explaining conventional band limiting methods. FIG. 3A shows the method which combines the base band filtering method and the RF filtering method described above, FIG. 3B shows the method which combines the DSP filtering method and the RF filtering method, and FIG. 3C shows the method which combines the DSP direct modulation method and the RF filtering method.

In FIG. 3A, a pulse shaped input data is input to a lowpass filter (LPF) 1 and smoothened. The smoothened output signal of the LPF 1 is input to a frequency modulation (FM) circuit 2 and frequency modulated. On the other hand, a central processing unit (CPU) 3 supplies a predetermined data to a phase locked loop (PLL) circuit 4. An output of the PLL circuit 4 is input to a voltage controlled oscillator (VCO) 5. An output of the VCO is fed back to the PLL circuit 4. As a result, the VCO 5 outputs a frequency signal having a fixed phase.

An output of the FM circuit 2 and the output of the VCO 5 are input to a mixer 6 and mixed. Hence, a spectrum signal having levels separated for every frequency as shown below the mixer 6 in FIG. 3A is output from the mixer 6. This spectrum signal is input to a RF filter circuit 7. The RF filter circuit 7 passes only a predetermined frequency component, and a signal having a single peak at a specific frequency as shown on the right of the RF filter circuit 7 in FIG. 3A is output from the RF filter circuit 7. Therefore, the modulated pulse data is converted into a frequency data.

In FIG. 3B, when a modulated pulse data is input to a DSP 10, the DSP 10 carries out an operation similar to that of a LPF by a digital processing. An output of the DSP 10 is converted into an analog signal by a digital-to-analog (D/A) converter 11. An output of the D/A converter 11 is input to the FM circuit 2 which carries out a frequency modulation dependent upon the input signal.

On the other hand, the CPU 3 supplies a predetermined data to the PLL circuit 4. An output of the PLL circuit 4 is input to the VCO 5. An output of the VCO 5 is fed back to the PLL circuit 4. As a result, the VCO 5 outputs a frequency signal having a fixed phase.

An output of the FM circuit 2 and the output of the VCO 5 are input to the mixer 6 and mixed. Hence, a spectrum signal having levels separated for every frequency as shown above the mixer 6 in FIG. 3B is output from the mixer 6. This spectrum signal is input to the RF filter circuit 7. The RF filter circuit 7 passes only a predetermined frequency component, and a signal having a single peak at a specific frequency as shown on the right of the RF filter circuit 7 in FIG. 3B is output from the RF filter circuit 7. Therefore, the modulated pulse data is converted into a frequency data.

In FIG. 3C, a modulated pulse data is input to a direct modulation DSP 20. The DSP 20 carries out a digital processing to calculate and output a frequency spectrum signal directly from the input pulse data. The frequency spectrum signal from the DSP 20 is input to the RF filter circuit 7 which passes only a predetermined frequency component. A signal having a single peak at a specific frequency as shown on the right of the RF filter circuit 7 in FIG. 3C is output from the RF filter circuit 7. Therefore, the modulated pulse data is converted into a frequency data.

The baseband filtering method carries out an analog processing, and a change in the frequency deviation curve depends on the data string to the modulated and the characteristics of the elements used. When passing the single pulse and the pulses having a short period through the LPF out of the modulated data string, there is a problem in that the actual frequency deviation point will not be reached. As a result, the demodulation carried out at the receiver becomes unstable.

FIGS. 4A through 4C are diagrams for explaining the frequency deviation of the modulated data. FIG. 4A shows the modulated data having the short period, FIG. 4B shows the modulated data having a single change, and FIG. 4C shows the modulated data having a long period. In FIGS. 4A through 4C, L1 indicates a deviation point of f0+Δf, and L2 indicates a deviation point of f0−Δf. When subjecting the modulated data having the short period shown in FIG. 4A and the modulated data having the single change shown in FIG. 4B to the frequency deviation, the frequency deviation point will not be reached. In the case shown in FIG. 4A, both the deviation points L1 and L2 are not reached. In the case shown in FIG. 4B, the deviation point L2 is reached, but the deviation point L1 is not reached. On the other hand, in the case of the modulated data having the long period shown in FIG. 4C, both the deviation points L1 and L2 are reached.

Returning now to the description of the band limiting methods, the RF filtering method uses a bandpass filter which is essential to pass only the necessary transmitting frequencies. The DSP filtering method and the DSP direct modulation method have become more popular in the recent years. The DSP filtering method prestores the frequency deviation curve corresponding to the modulated data, and carries out the frequency deviation. The DSP direct modulation method calculates the frequency deviation curve corresponding to the modulated data in real-time, and carries out the frequency deviation.

However, in the case of the radio communication, the specification specifies that "the cutoff frequency is XX Hz or greater" or the like, and the frequency deviation is not carried out by taking into consideration and to suit the data string, the leakage power to the adjacent channel and the reception characteristic.

(1) A description will be given of a case where the LPF passes the single data string shown in FIG. 4A or the data string having a short period shown in FIG. 4B.

In this case, the data string can be regarded as being a square wave pulse from the point of view of a distortion wave A.C. waveform. The square wave pulse can be represented by a family of sets of the high-frequency component by a Fourier series, and thus, the high-frequency component is eliminated and the waveform is smoothened by passing the square wave pulse through the LPF.

On the other hand, the power is lost by an amount corresponding to the eliminated high-frequency component, and the frequency deviation point is not reached when the modulation is carried out, as may be seen from FIG. 4A. When the modulated waveform does not reach the frequency deviation point, there is a problem in that the demodulation cannot be carried out normally at the receiver due to the disadvantageous conditions with respect to the receiver.

(2) A description will be given of a case where filters having the same characteristic are used with respect to the frequency deviation of the FSK, by referring to FIG. 5.

FIG. 5 is a diagram showing the frequency deviation for the case where filters having the same characteristic are used. In FIG. 5, the ordinate indicates the frequency and the abscissa indicates the time. When the FSK modulation takes a multiple-value (or multi-level value), the frequency deviation may be made to a plurality of deviation points as shown in FIG. 5. In FIG. 5, L1 through L4 denote deviation points, T denotes a frequency deviation time, t1 denotes a time it takes to reach a demodulation range DM2 having a small frequency deviation, and t2 denotes a time it takes to reach a demodulation range DM1 having a large frequency deviation. In addition, marks "o" indicate sampling points for the case where the frequency deviation is large, and marks "x" indicate sampling points for the case where the frequency deviation is small.

The filter naturally satisfies the characteristic of the leakage power to the adjacent channel. In this case, although t1<t2, the rate of the frequency deviation is constant regardless of the size of the frequency deviation.

On the other hand, it is assumed that the demodulation ranges DM1 and DM2, which are the ranges in which the demodulation can positively be carried out at the receiver, are constant. In this case, the time t1 it takes for the small frequency deviation to reach the demodulation range DM2 is shorter, that is, quicker, than the time t2 it takes for the large frequency deviation to reach the demodulation range DM1, and thus, the demodulation has a sufficient margin such that a highly stable demodulation is possible.

On the contrary, the demodulation becomes difficult on the side of the large frequency deviation, thereby making it the minimum frequency deviation condition. In addition, a quick response is required for the demodulation, but the leakage power to the adjacent channel tends to increase.

FIG. 6 is a diagram showing an example of a frequency deviation condition and characteristic. FIG. 6 shows how a demodulation stability and the leakage power to the adjacent channel are related to the setting of the frequency deviation condition (that is, frequency deviation curve). In FIG. 6, the demodulation stability for the large frequency deviation, the demodulation stability for the small frequency deviation and the leakage power to the adjacent channel are respectively shown for cases where the frequency deviation condition is set so that the deviation point suits the large frequency deviation, the deviation point suits the small frequency deviation, and the deviation point is optimized for the large and small frequency deviations. In FIG. 6, a mark "x" indicates a value outside the range of the standard value, a mark "o" indicates a value within the range of the standard value, and a double circular mark indicates a value which is extremely good and exceeds the standard.

The following can be confirmed by FIG. 6.

First, when the frequency deviation condition suits the large frequency deviation, the demodulation stability is particularly good for the small frequency deviation, and the demodulation stability for the large frequency deviation also falls within the standard. However, the leakage power to the adjacent channels does not satisfy the standard.

Second, when the frequency deviation condition suits the small frequency deviation, the leakage power to the adjacent channel is extremely good and exceeds the standard, and the demodulation stability for the small frequency deviation falls within the standard. However, the demodulation stability for the large frequency deviation does not satisfy the standard.

Third, when the frequency deviation condition is optimized for the large and small frequency deviations, the demodulation stability for the large frequency deviation, the demodulation stability for the small frequency deviation, and the leakage power to the adjacent channel all satisfy the respective standards.

Therefore, the present inventor has found that both the demodulation stability and the leakage power to the adjacent channel can simultaneously satisfy the respective standards by optimizing the frequency deviation condition for each frequency deviation.

SUMMARY OF THE INVENTION

Accordingly, it is a general object of the present invention to provide a novel and useful modulation system in which the problems described above are eliminated.

Another and more specific object of the present invention is to provide a modulation system which can satisfy a standard for a leakage power to the adjacent channel and at the same time carry out a frequency deviation which is advantageous to a receiver.

Still another object of the present invention is to provide a modulation system comprising a data analyzer detecting input of a modulated data and a modulation clock signal and latching and detecting an edge of the modulated data, in response to the modulated data and the modulation clock signal, a signal controller, responsive to an output of the data analyzer, carrying out an operation process with respect to the frequency deviation data and carrying out one of a frequency deviation amplitude control operation and a frequency deviation time control operation, a digital-to-analog converter converting an output of the signal controller into an analog signal, and a transmitting unit transmitting an output of the digital-to-analog converter. According to the modulation system of the present invention, it is possible to satisfy a standard of a leakage power to an adjacent channel while making a frequency deviation which is advantageous to a receiver.

Other objects and further features of the present invention will be apparent from the following detailed description when read in conjunction with the accompanying drawings.

BRIEF DESCRIPTION OF THE DRAWINGS

FIGS. 1A and 1B respectively are diagrams for explaining a slow frequency deviation;

FIG. 6 is a diagram showing an example of a frequency deviation condition and characteristic;

FIG. 7 is a system block diagram for explaining the operating principle of the present invention;

FIG. 10 is a diagram showing a first embodiment of the frequency deviation condition and characteristic;

FIG. 12 is a diagram showing a second embodiment of the frequency deviation condition and characteristic;

FIG. 14 is a diagram showing a third embodiment of the frequency deviation condition and characteristic;

FIG. 20 is a diagram showing a pointer of modulated data;

DESCRIPTION OF THE PREFERRED EMBODIMENTS

Figure 2A:
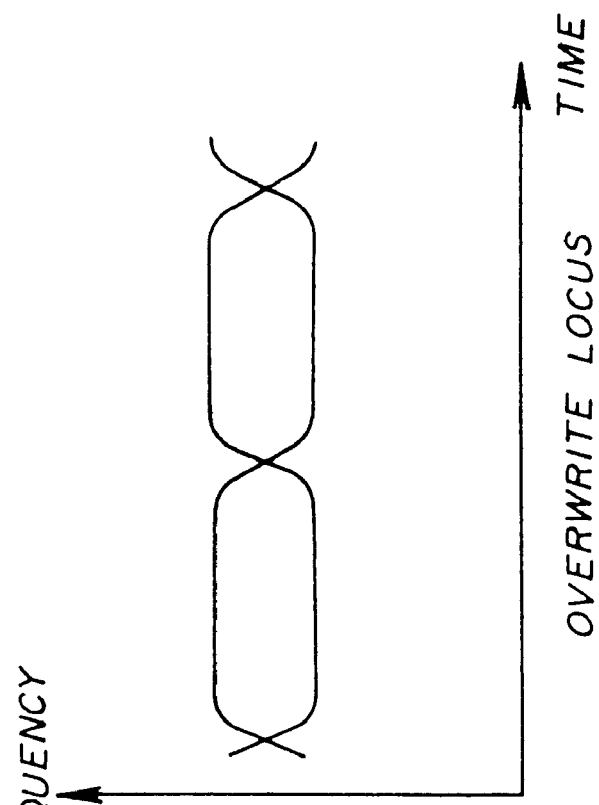
FIGS. 2A and 2B respectively are diagrams for explaining a fast frequency deviation.
Figure 2B:
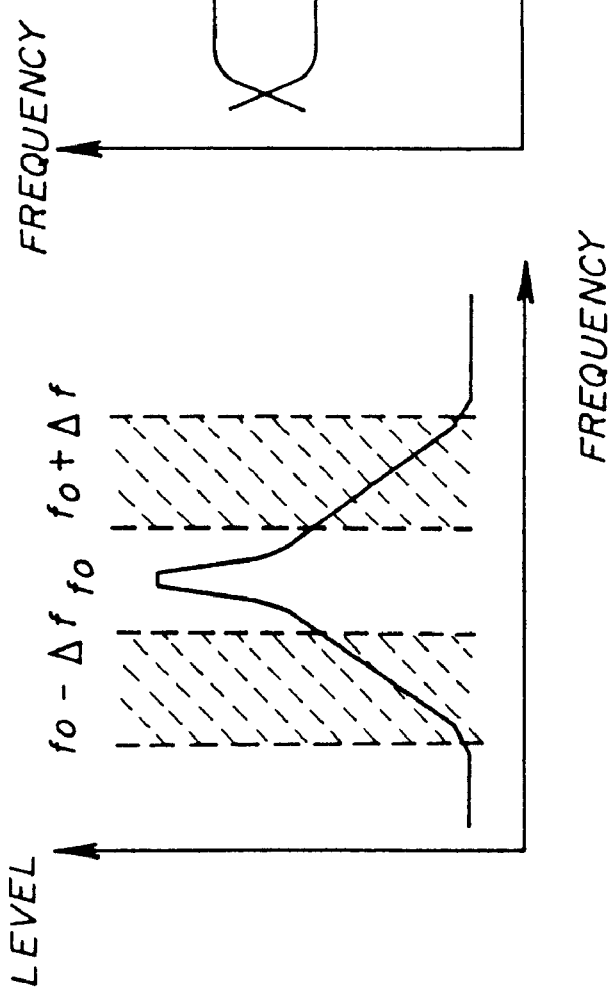
Figure 3A:
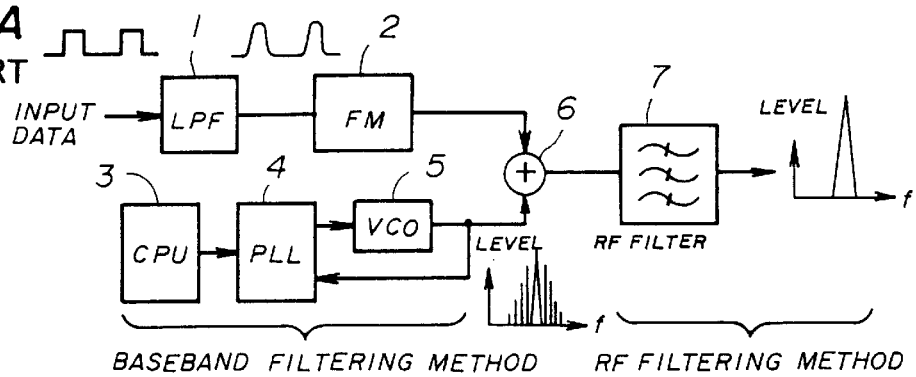
FIGS. 3A through 3C respectively are diagrams for explaining conventional band limiting methods.
Figure 3B:
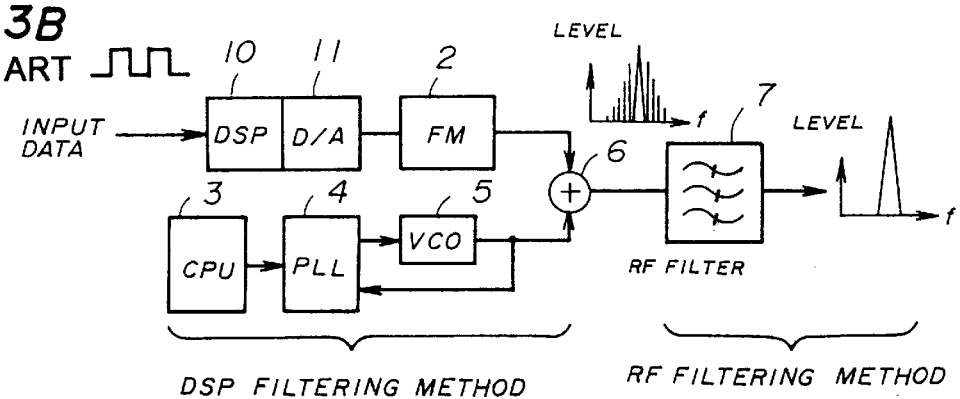
Figure 3C:
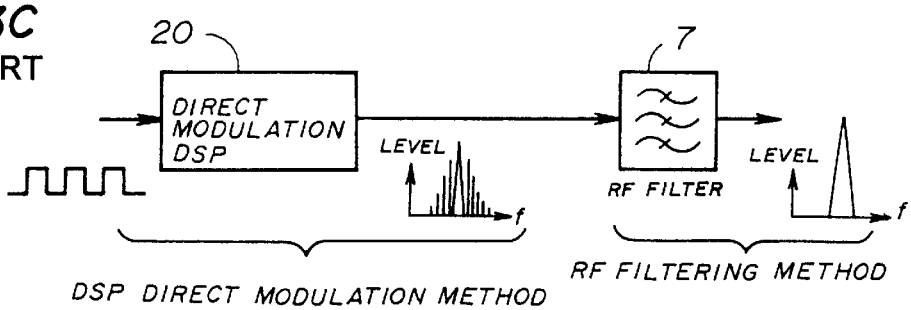
Figure 4A:
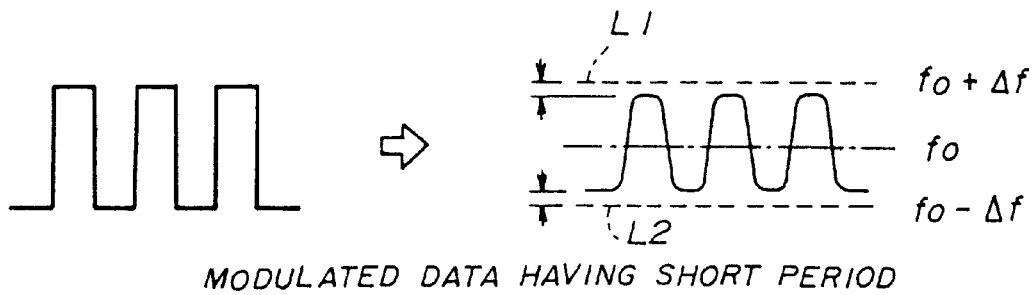
FIGS. 4A through 4C respectively are diagrams for explaining frequency deviations of demodulated data.
Figure 4B:
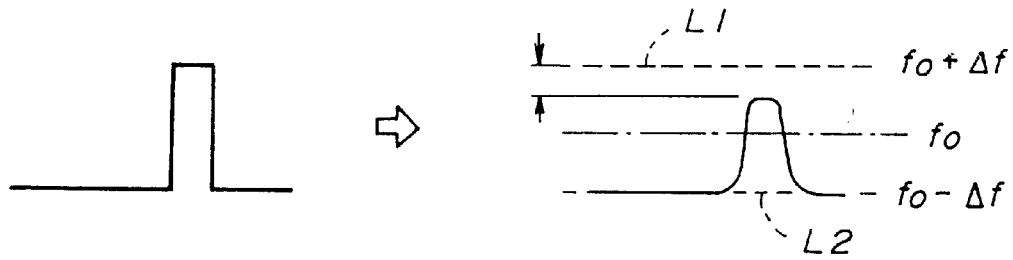
Figure 4C:
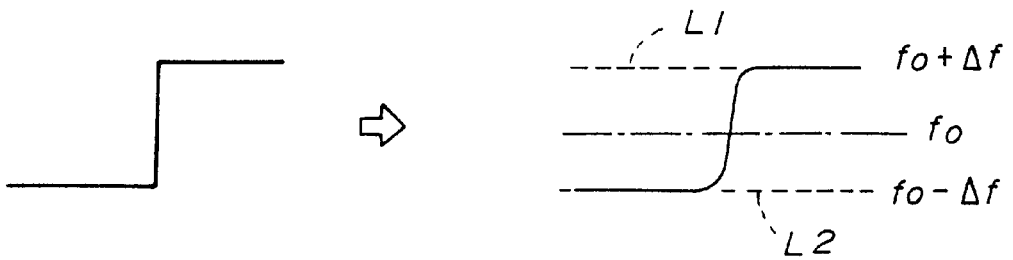

First, a description will be given of the operating principle of the present invention, by referring to FIG. 7. In FIG. 7, a modulated data and a modulation clock signal are input to a data analyzer 30. The data analyzer 30 detects the input of the modulated data and the modulation clock signal, and makes a data latch operation and an edge detection operation. The data analyzer 30 may store a standard frequency deviation data. A signal controller 40 receives an output of the data analyzer 30, and carries out an operation process with respect to the frequency deviation data, so as to make a frequency deviation amplitude control operation or a frequency deviation time control operation. A digital-to-analog (D/A) converter 50 converts an output of the signal controller 40 into an analog signal. A transmitting unit 60 transmits an output of the D/A converter 50.

When the data analyzer 30 detects the input modulated data, the signal controller 40 reads the standard frequency deviation data stored in the data analyzer 30 according to a predetermined system, and carries out an operation process with respect to the standard frequency deviation data, so as to make the frequency deviation amplitude control operation or the frequency deviation time control operation. Hence, it is possible to satisfy a standard of a leakage power to an adjacent channel while making a frequency deviation which is advantageous to a receiver.

The data analyzer 30 may include a detector for latching the input data and detecting an edge of the input data, an address counter for outputting an address with respect to the signal controller 40, and an analyzer having a memory which stores the standard frequency deviation data. The signal controller 40 may be made of a digital signal processor (DSP) which carries out a predetermined frequency deviation amplitude control operation or frequency deviation time control operation with respect to the standard frequency deviation data output from the memory.

In this case, because the DSP carries out the predetermined frequency deviation amplitude control operation or frequency deviation time control operation with respect to the standard frequency deviation data read from the memory, it is possible to satisfy the standard of the leakage power to the adjacent channel while making the frequency deviation which is advantageous to the receiver.

The data analyzer 30 may include a detector for latching the input data and detecting an edge of the input data, and a memory which stores the standard frequency deviation data. The signal controller 40 may be made of a DSP which carries out a predetermined frequency deviation amplitude control operation or frequency deviation time control operation with respect to the standard frequency deviation data output from the memory.

In this case, because the DSP carries out the predetermined frequency deviation amplitude control operation or frequency deviation time control operation with respect to the standard frequency deviation data read from the memory, it is possible to satisfy the standard of the leakage power to the adjacent channel while making the frequency deviation which is advantageous to the receiver.

The data analyzer 30 may include a detector for latching the input data and detecting an edge of the input data, and the signal controller 40 may be made of a DSP which compares a previous modulated data previously latched by the detector and a present modulated data presently latched by the detector in response to the detection of the input modulated data and the edge detection made by the detector. In this case, the DSP creates a standard frequency deviation data based on a comparison result, and carries out a predetermined frequency deviation amplitude control operation or frequency deviation time control operation with respect to the created standard frequency deviation data.

In this case, because no memory is required and the DSP carries out the predetermined frequency deviation amplitude control operation or frequency deviation time control operation with respect to the standard frequency deviation data depending on the input modulated data, it is possible to satisfy the standard of the leakage power to the adjacent channel while making the frequency deviation which is advantageous to the receiver.

The data analyzer 30 may be made of a central processing unit (CPU) which reads the input modulated data and stores the modulated data in an internal memory, and the signal controller 40 may be made of a DSP which compares the modulated data stored in the internal memory of the CPU and the present modulated data. In this case, the DSP creates a standard frequency deviation data depending on a comparison result, and carries out a predetermined frequency deviation amplitude control operation or frequency deviation time control operation with respect to the created standard frequency deviation data in real-time.

In this case, because the CPU reads the input modulated data and the DSP carries out the predetermined frequency deviation amplitude control operation or frequency deviation time control operation with respect to the standard frequency deviation data depending on the input modulated data, it is possible to satisfy the standard of the leakage power to the adjacent channel while making the frequency deviation which is advantageous to the receiver.

Alternatively, the CPU may store and compare the previous and present demodulated data, and the DSP may create a standard frequency deviation data depending on a comparison result. In this case, the DSP carries out a predetermined frequency deviation amplitude control operation or frequency deviation time control operation with respect to the created standard frequency deviation data in real-time.

In this case, it is possible to improve the leakage power to the adjacent channel and a demodulation condition, by outputting an optimum frequency deviation for each frequency deviation.

Furthermore, the signal controller 40 may be made of a DSP which judges the direction and time of the frequency deviation and the frequency amplitude of the frequency deviation in response to the output of the data analyzer 30.

In this case, by use of the DSP, it is possible to easily judge the direction and time of the frequency deviation and the frequency amplitude of the frequency deviation in response to the output of the data analyzer 30.

Next, a description will be given of embodiments of a modulation system according to the present invention, by referring to FIGS. 8A through 30.

Figure 15:
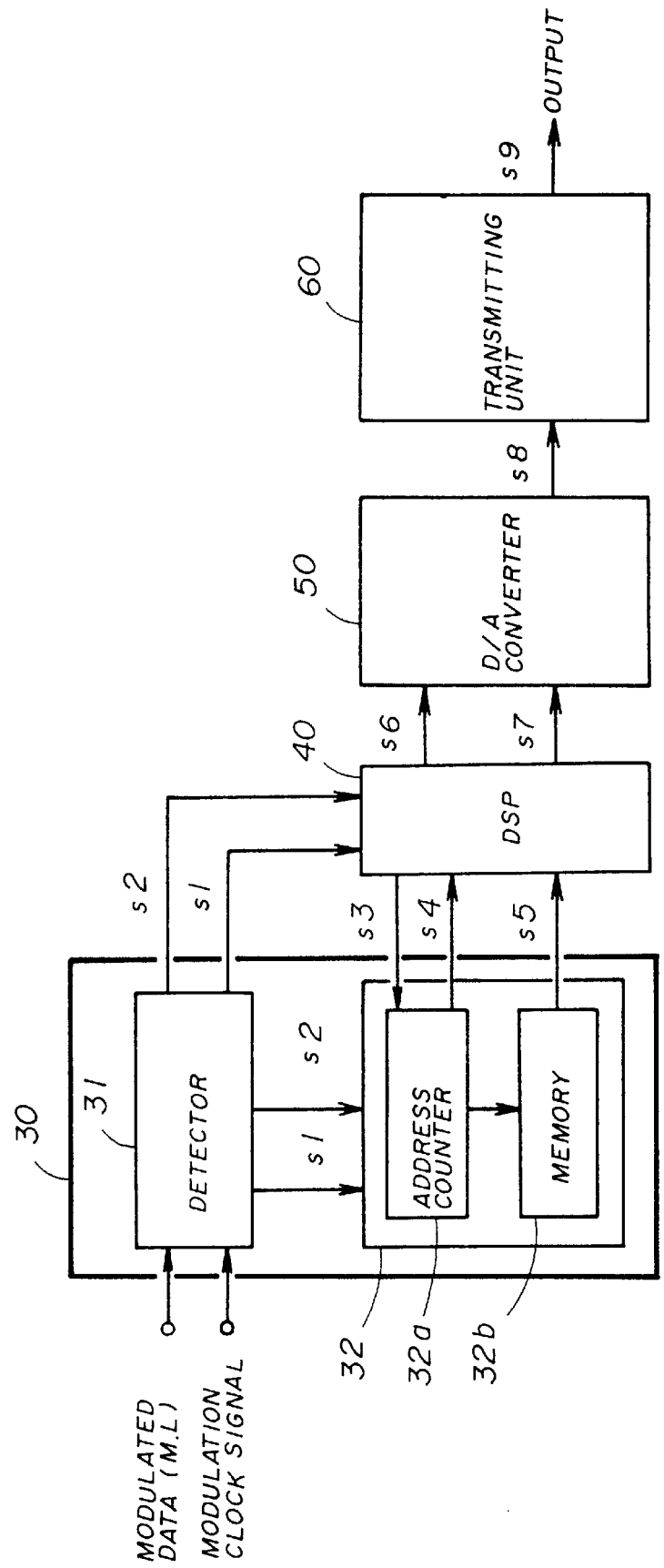
FIG. 15 is a system block diagram showing a first embodiment of a modulation system according to the present invention.

In a first embodiment of the modulation system, the data analyzer 30 is made of a detector 31 and an analyzer 32 as shown in FIG. 15 which will be described later. The analyzer 32 includes an address counter 32$a$ and a memory 32$b$. The detector 31 uses a modulation clock signal as a trigger, and detects an edge after latching the input modulated data. For example, an interrupt port of a CPU is used for the data of the modulated data string, and the process is carried out by the CPU which carries out the functions of the data analyzer 30.

The memory 32$b$ prestores frequency deviation data, and the data analyzer 30 selects a frequency deviation data corresponding to the detected data from the frequency deviation data stored in the memory 32$b$. In addition, the data analyzer 30 calculates the frequency deviation data with respect to the detected data in real-time.

Figure 8B:
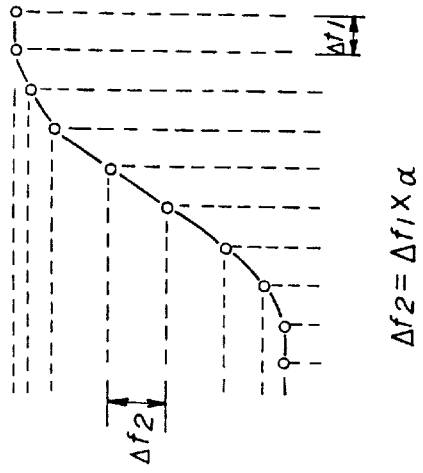
FIGS. 8A through 8C respectively are diagrams for explaining a standard frequency deviation curve, a frequency deviation amplitude control and a frequency deviation time control.
Figure 8A:
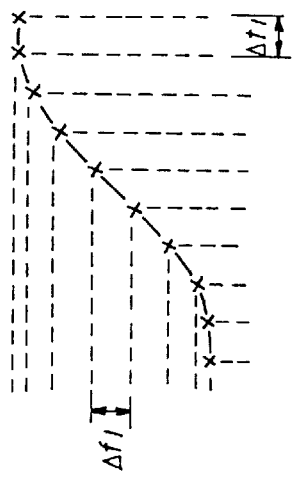
Figure 8C:
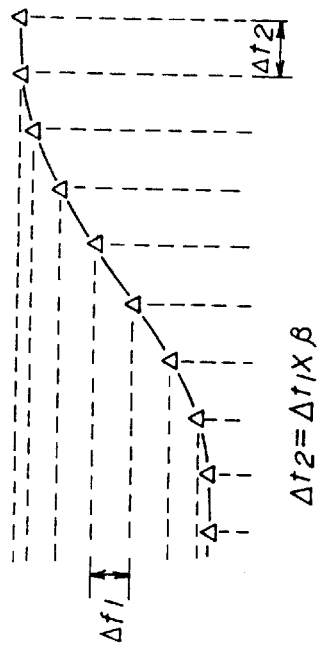

A description will now be given of the frequency deviation amplitude control operation and the frequency deviation time control operation of the signal controller 40. FIGS. 8A through 8C are diagrams for explaining a standard frequency deviation curve, the frequency deviation amplitude control operation and the frequency deviation time control operation. FIG. 8A is a diagram for explaining the standard frequency deviation curve stored in the memory 32$b$ of the data analyzer 30, FIG. 8B is a diagram for explaining the frequency deviation amplitude control operation, and FIG. 8C is a diagram for explaining the frequency deviation time control operation. The standard frequency deviation curve stored in the memory 32$b$ is a characteristic curve which is sampled at a width $\Delta t1$ in a direction of the time base, and a frequency deviation thereof changes by $\Delta f$ at each sampling point. The width $\Delta t1$ is a constant time, while the frequency deviation $\Delta f$ is not constant for each sampling point but has a arbitrary width at each sampling point. FIG. 8A shows a case where the frequency deviation Δf is Δf1.

In the case of the frequency deviation amplitude control operation, the frequency deviation width shown in FIG. 8A may be used as it is. FIG. 8B is a diagram for explaining the frequency deviation amplitude control operation, and shows a case where the amplitude in the frequency direction is changed to Δf2, where Δf2 is described by the following formula (1), and α denotes a frequency deviation width magnification.

$$\Delta f2 = \Delta f1 \cdot \alpha \tag{1}$$

When the amplitude is varied for all sampling points, it is possible to obtain a characteristic curve which is enlarged or reduced in the amplitude direction (frequency direction) as shown in FIG. 8B.

FIG. 8C is a diagram for explaining the frequency deviation time control operation, and shows a case where a period Δt in the time base direction shown in FIG. 8A is changed for every sampling point. In this case, it is also possible to use the characteristic curve shown in FIG. 8B by reading this characteristic curve at a predetermined time width. FIG. 8C shows a case where the time width Δt1 is changed to Δt2, where Δf2 is described by the following formula (2), and β denotes a frequency deviation time magnification.

$$\Delta f2 = \Delta f1 \cdot \beta \tag{2}$$

As a result, when the time width is changed for all sampling points, it is possible to obtain a characteristic curve which is expanded or compressed in the time base direction as shown in FIG. 8C.

The frequency deviation amplitude control (frequency deviation width control) operation and the frequency deviation time control operation described above are carried out by the operation of the signal controller 40 shown in FIG. 7.

Figure 9:
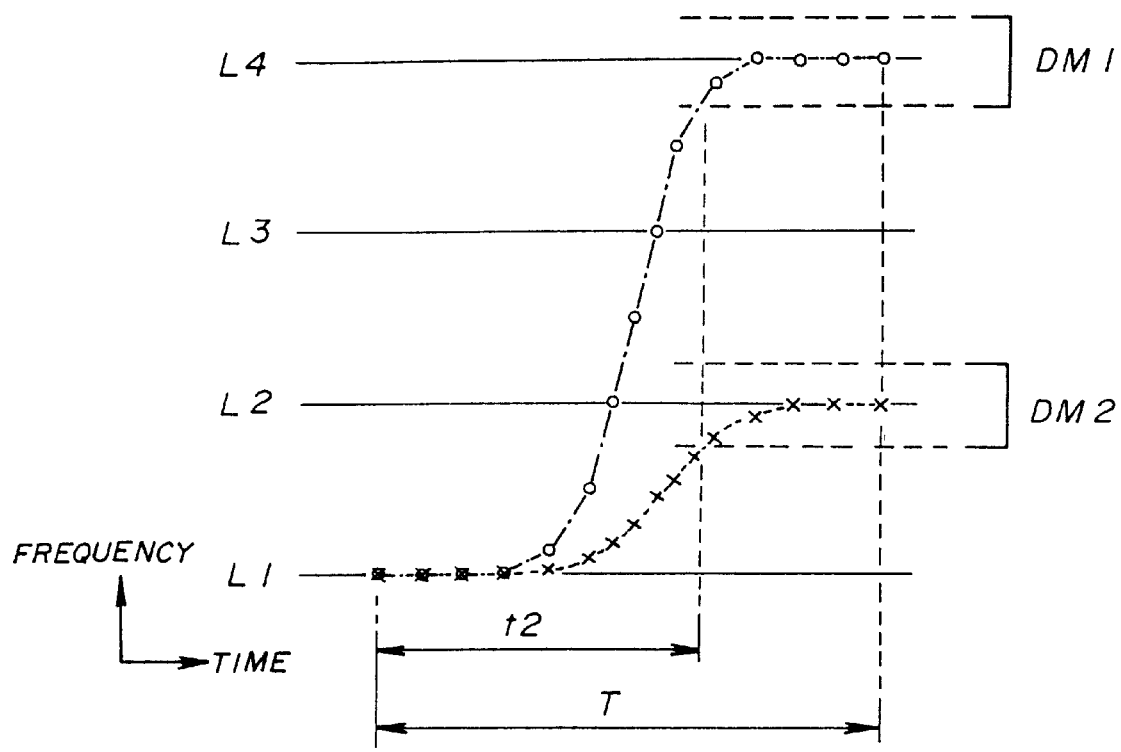
FIG. 9 is a diagram for explaining a method of delaying a response of a filter having a small frequency deviation.

Next, a detailed description will be given of a filter response in this embodiment. FIG. 9 is a diagram for explaining a method of delaying the response of the filter having a small frequency deviation. In FIG. 9, the same designations are used as in FIG. 5.

Figure 5:
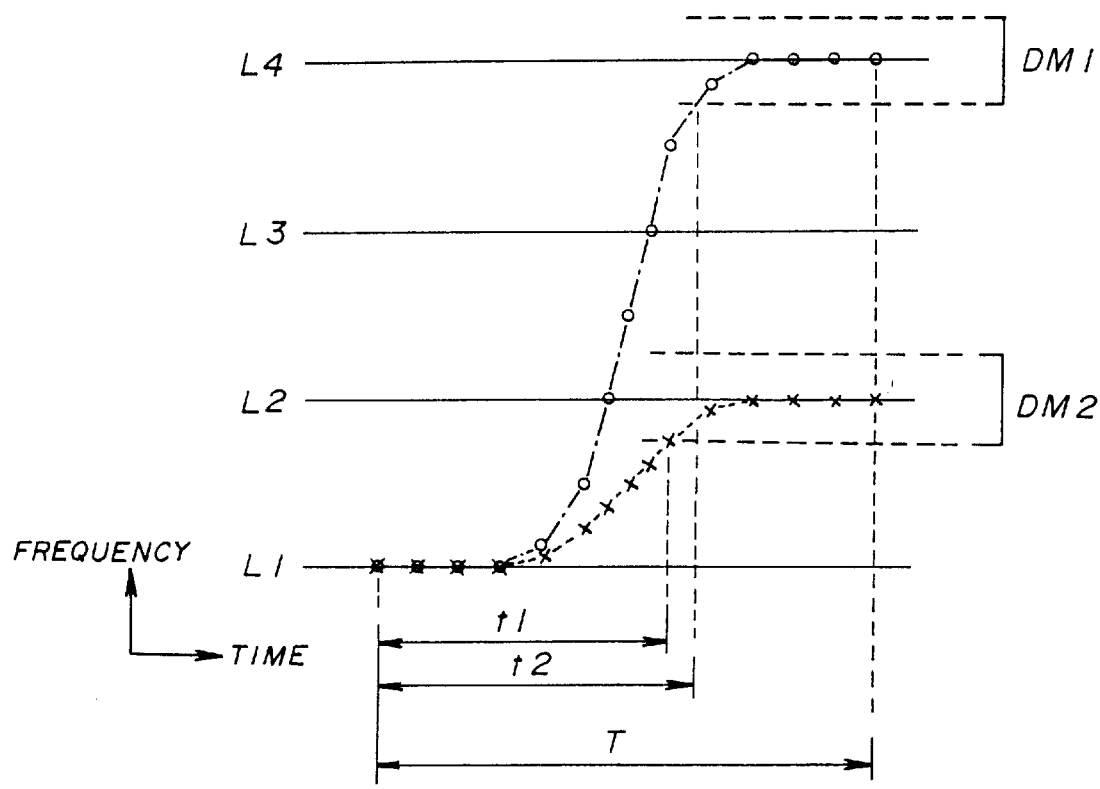
FIG. 5 is a diagram showing a frequency deviation using filters having the same characteristic.

In FIG. 5 described above, the filter response for the small frequency deviation and the filter response for the large frequency deviation were described for the case where the same filter is used. But in FIG. 9, the filter characteristics of the filter response for the small frequency deviation and the filter response for the large frequency deviation are controlled independently.

When the frequency deviations take place using the same filter characteristic as shown in FIG. 5, the filter response for the small frequency deviation reaches the demodulation range before the filter response for the large frequency deviation. On the other hand, in the case shown in FIG. 9, the filter characteristic is changed so that the filter response for the small frequency deviation matches the time it takes to reach the demodulation range DM1 having the large frequency deviation. In other words, the time it takes to reach the demodulation range DM2 having the small frequency deviation in FIG. 9 is matched to the time t2 it takes for the filter response for the large frequency deviation to reach the demodulation range DM1 having the large frequency deviation in FIG. 5.

The signal controller 40 shown in FIG. 7 controls the frequency deviation in response to the detected modulated data string. When the frequency deviation is small, the time it takes to reach the demodulation range DM2 is matched to the time t2. The demodulation condition on the receiver side is determined by the large frequency deviation, and no problems are introduced by delaying the filter response for the small frequency deviation. The above described process is realized by the signal controller 40 which carries out a predetermined operation process with respect to the standard frequency deviation data stored in the data analyzer 30. As a result, the leakage power to the adjacent channel is improved when the frequency deviation is small.

FIG. 10 is a diagram showing a first embodiment of the frequency deviation condition and characteristic in accordance with the method described above in conjunction with FIG. 9. In FIG. 10, the same designations are used as in FIG. 6 described above. By matching the filter response characteristic for the small frequency deviation to the time t2 it takes to reach the demodulation range DM1, it may be seen from FIG. 10 that the demodulation stability for the large frequency deviation, the demodulation stability for the small frequency deviation and the leakage power to the adjacent channel all fall within the respective standards.

Figure 11:
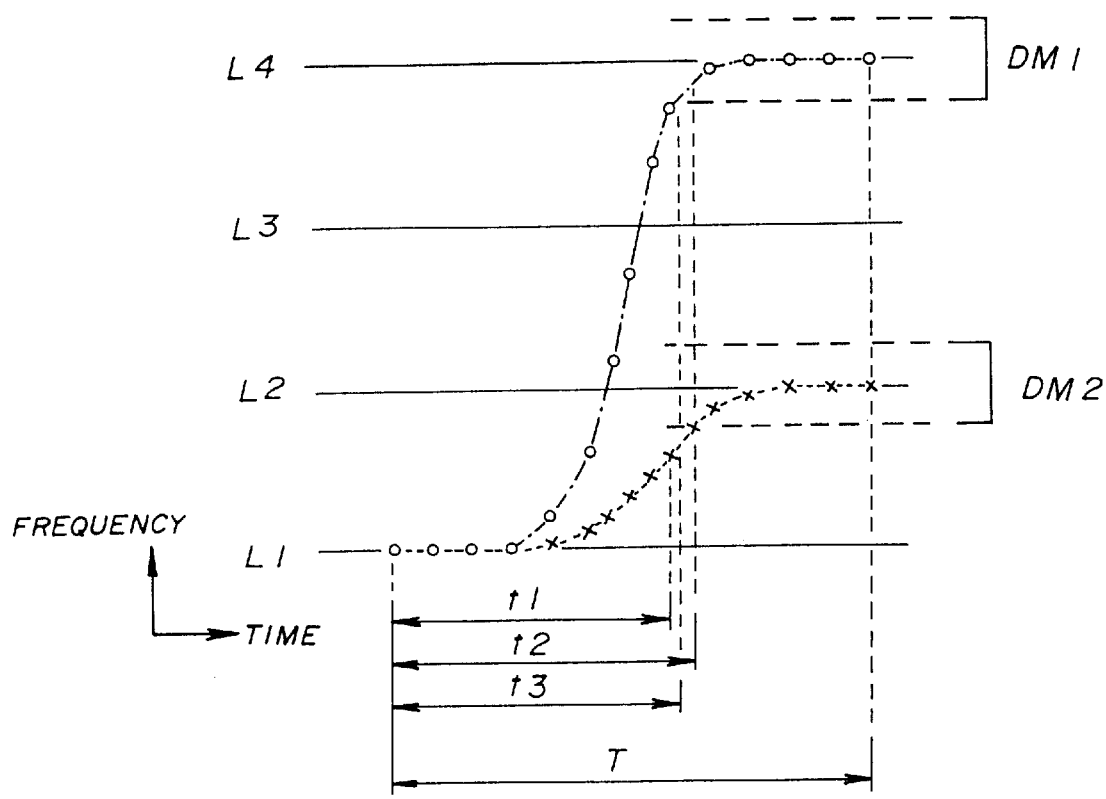
FIG. 11 is a diagram for explaining a method of advancing a filter response for a large frequency deviation and delaying the filter response for a small frequency deviation.

FIG. 11 is a diagram for explaining a method of advancing the filter response for the large frequency deviation and delaying the filter response for the small frequency deviation. In FIG. 11, the same designations are used as in FIG. 5 described above.

First, the signal controller 40 judges the size of the frequency deviation. When the frequency deviation is large, the time it takes to reach the demodulation range DM1 is set to t3, where t1<t3<t2, and t1 and t2 are shown in FIG. 5 described above.

On the other hand, when the frequency deviation is small, the time it takes to reach the demodulation range DM2 is set to t2. The demodulation condition of the receiver is determined by the small frequency deviation, and no problems are introduced since the demodulation condition is satisfied by this setting.

Although the leakage power to the adjacent channel slightly deteriorates for the large frequency deviation, the standard of the leakage power is still satisfied, and further, it is possible to provide the demodulation condition. In addition, since the leakage power to the adjacent channel is improved for the small frequency deviation, the characteristic of the leakage power to the adjacent channel as a whole satisfies the standard. The above described process can be realized by carrying out a predetermined operation process by the signal controller 40 with respect to the standard frequency deviation data stored in the data analyzer 30.

FIG. 12 is a diagram for explaining a second embodiment of the frequency deviation condition and characteristic in accordance with the method described above in conjunction with FIG. 11. In FIG. 12, the same designations are used as in FIG. 6 described above. By advancing the filter response for the large frequency deviation and delaying the filter response for the small frequency deviation. it may be seen from FIG. 12 that the demodulation stability for the large frequency deviation, the demodulation stability for the small frequency deviation and the leakage power to the adjacent channel all fall within the respective standards.

Figure 13:
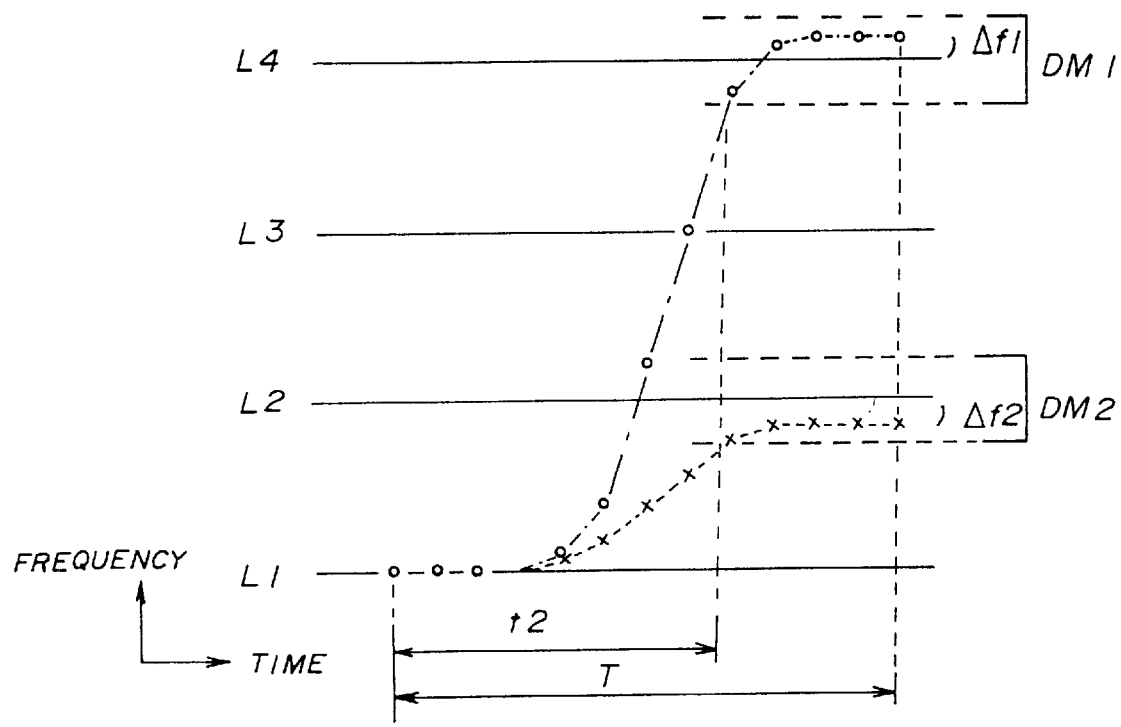
FIG. 13 is a diagram for explaining a method of controlling a frequency deviation width.

FIG. 13 is a diagram for explaining a method of controlling the frequency deviation width. In FIG. 13, the same designations are used as in FIG. 5 described above.

In this case, the data analyzer 30 judges the frequency deviation of the modulated data. When the frequency deviation is large, the signal controller 40 controls the frequency deviation to increase the width so that it becomes Δf1 larger than the deviation point L4. As a result, the characteristic exceeds the deviation point L4 as shown in FIG. 13. For this reason, it is possible to reach the demodulation range DM1 within a short time when the frequency deviation is large, and the demodulation stability at the receiver side is improved.

On the other hand, when the frequency deviation is small, the signal controller 40 controls the frequency deviation to reduce the width so that it becomes Δf2 smaller than the deviation point L2. As a result, it is possible to smoothly reach the demodulation range DM2, and the leakage power to the adjacent channel is improved.

FIG. 14 is a diagram for explaining a third embodiment of the frequency deviation condition and characteristic in accordance with the method described above in conjunction with FIG. 13. In FIG. 14, the same designations are used as in FIG. 6 described above. By controlling the frequency deviation width in the above described manner. it may be seen from FIG. 14 that the demodulation stability for the large frequency deviation, the demodulation stability for the small frequency deviation and the leakage power to the adjacent channel all fall within the respective standards.

FIG. 15 is a system block diagram showing the first embodiment of the modulation system according to the present invention. In FIG. 15, those parts which are the same as those corresponding parts in FIG. 7 are designated by the same reference numerals. This embodiment employs a memory storage analysis method.

In FIG. 15, the data analyzer 30 receives and detects the input of the modulated data and the modulation clock signal thereto. The data analyzer 30 latches and detects the edge of the modulated data, and also stores the standard frequency deviation data. The data analyzer 30 is made up of the detector 31 and the analyzer 32.

The detector 31 latches and detects the edge of the modulated data. The analyzer 32 is made up of the address counter 32a and the memory 32b. The address counter 32a counts the modulation clock signal, and supplies an address to the memory 32b.

The memory 32b stores the frequency deviation data such as that shown in FIG. 8A. The detector 31 supplies an edge detection signal s1 and a detection data (M, L) s2 to the analyzer 32. The modulated data is supplied to the detector 31 via 2 signal lines. Signals from these 2 signal lines are respectively denoted by M and L, and a pointer is made up by a combination of values of these signals M and L, as will be described later.

The signal controller 40 is made up of a DSP. The DSP 40 receives an output of the data analyzer 30, and carries out the frequency deviation amplitude (width) control operation or the frequency deviation time control operation by making an operation process with respect to the frequency deviation data. The DSP 40 receives the edge detection signal s1 and the detection data s2 from the detector 31. The DSP 40 supplies an address count control signal s3 to the address counter 32a, and receives a count end signal s4 from the address counter 32a. The frequency deviation data read from the memory 32b is supplied to the DSP 40 as a frequency deviation data s5.

The D/A converter 50 converts the output of the DSP 40 into an analog signal. The D/A converter 50 receives a frequency deviation curve calculation data write timing clock signal s6 and a frequency deviation curve calculation data s7 from the DSP 40. The D/A converter 50 converts the frequency deviation curve calculation data s7 into an analog signal in synchronism with the clock signal s6.

The transmitting unit 60 transmits the output (modulated wave) of the D/A converter 50. A RF filter for passing only a predetermined frequency component is provided within the transmitting unit 60, so that a transmitting output signal s9 having the predetermined frequency component is transmitted from the transmitting unit 60.

According to this embodiment, when the data analyzer 30 detects the input modulated data, the DSP 40 reads the standard frequency deviation data stored in the data analyzer 30 according to a predetermined system, and carries out the frequency deviation amplitude (width) control operation or the frequency deviation time control operation by making the operation process with respect to the standard frequency deviation data. As a result, it is possible to carry out a frequency deviation which is advantageous to the receiver while satisfying the standard of the leakage power to the adjacent channel.

The circuit operation of the modulation system shown in FIG. 15 is as follows. That is, when the modulation clock signal and the modulated data are input to the data analyzer 30, the detector 31 latches and detects the edge of the modulated data. When the detector 31 detects the input of the modulated data, the detector 31 notifies the input of the modulated data to the DSP 40. In the analyzer 32 of the data analyzer 30, the address counter 32a starts to count the modulation clock signal in response to the address count control signal s3 received from the DSP 40.

A counted value output from the address counter 32a is supplied to the memory 32b as the address. The frequency deviation data stored at the address supplied from the address counter 32a is successively read from the memory 32b and output to the DSP 40. The DSP 40 carries out the predetermined operation process with respect to the standard frequency deviation data when the frequency deviation data is read and received from the memory 32b.

The frequency deviation width magnification is multiplied to the frequency deviation data when carrying out the frequency deviation amplitude (width) control operation described above in conjunction with FIG. 8B. On the other hand, the output data time is multiplied by the frequency deviation time magnification when carrying out the frequency deviation time control operation described above in conjunction with FIG. 8C. The data (modulated wave) which is subjected to the operation in the DSP 40 is converted into the analog modulated wave in synchronism with the clock signal s6 by the D/A converter 50. The output modulated wave of the D/A converter 50 is input to the transmitting unit 60 which extracts only the predetermined frequency component and outputs the predetermined frequency component as the transmitting output signal s9.

Hence, according to this embodiment, the DSP 40 carries out the frequency deviation amplitude (width) control operation or the frequency deviation time control operation by making the operation process with respect to the frequency deviation data output from the memory 32b. As a result, it is possible to carry out a frequency deviation which is advantageous to the receiver while satisfying the standard of the leakage power to the adjacent channel.

In addition, by using the DSP 40 as the signal controller 40, it is possible to easily judge the frequency deviation responsive to the output of the data analyzer 30.

Furthermore, by outputting the optimum frequency deviation with respect to each frequency deviation, it is possible to improve the leakage power to the adjacent channel and the demodulation condition. It is also possible to simplify the circuit construction. Moreover, even in the case of the multiple-value (or multi-level value) frequency deviation, it is possible to obtain the above described effects by use of a circuit similar to that described above.

Figure 16:
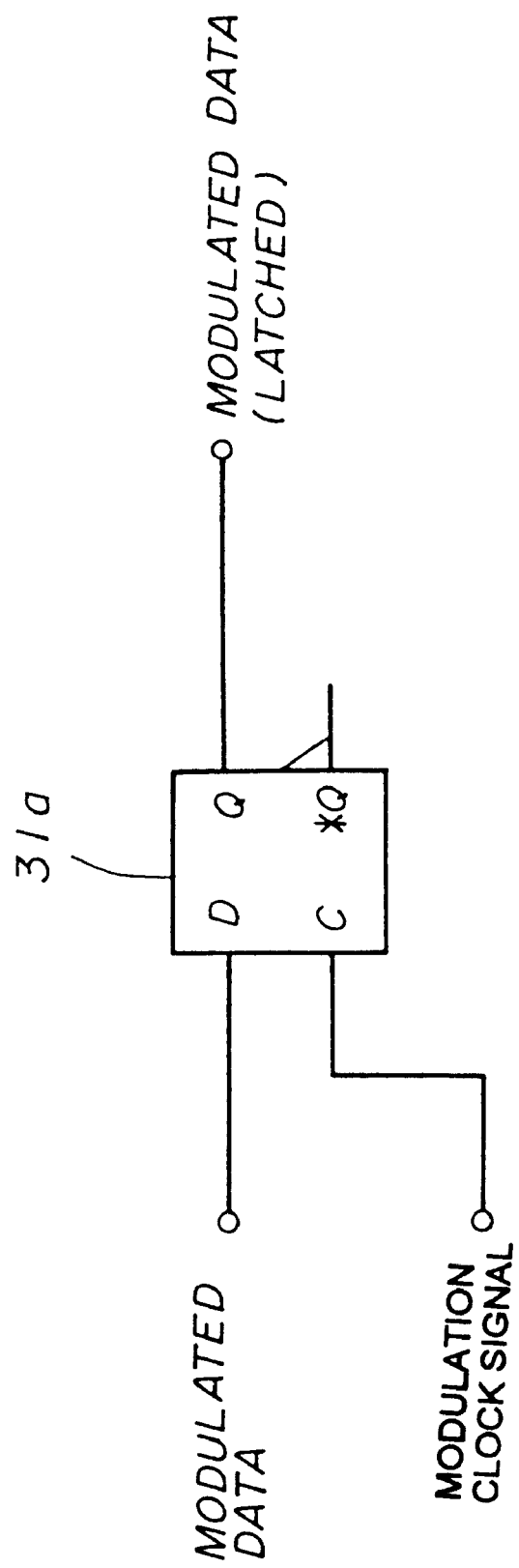
FIG. 16 is a diagram showing the construction of an embodiment of a latch in a detector.

FIG. 16 is a diagram showing the construction of an embodiment of the detector 31. In FIG. 16, a Delay (D-type)

flip-flop 31a forms a latch of the detector 31. The flip-flop 31a has a data input terminal D which receives the demodulated data, and a clock terminal C which receives the modulation clock signal. The flip-flop 31a latches the modulated data at a rising edge of the modulation clock signal, and the latched data is output from a Q-output of the flip-flop 31a as the modulated data.

Figure 17:
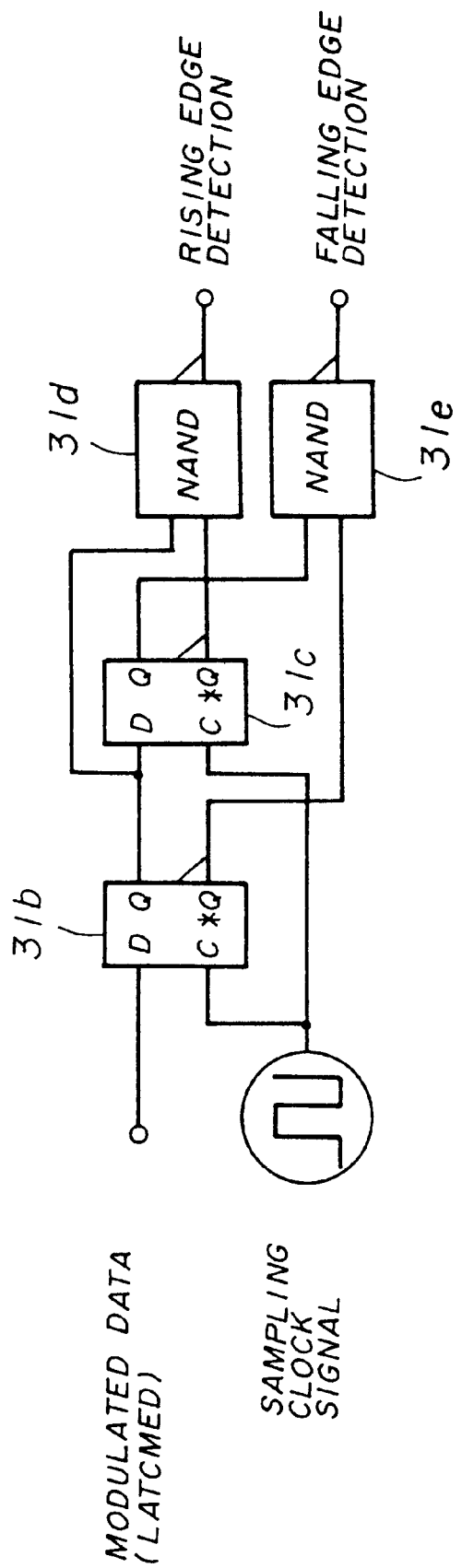
FIG. 17 is a diagram showing the construction of an embodiment of an edge detection circuit of the detector.
Figure 18:
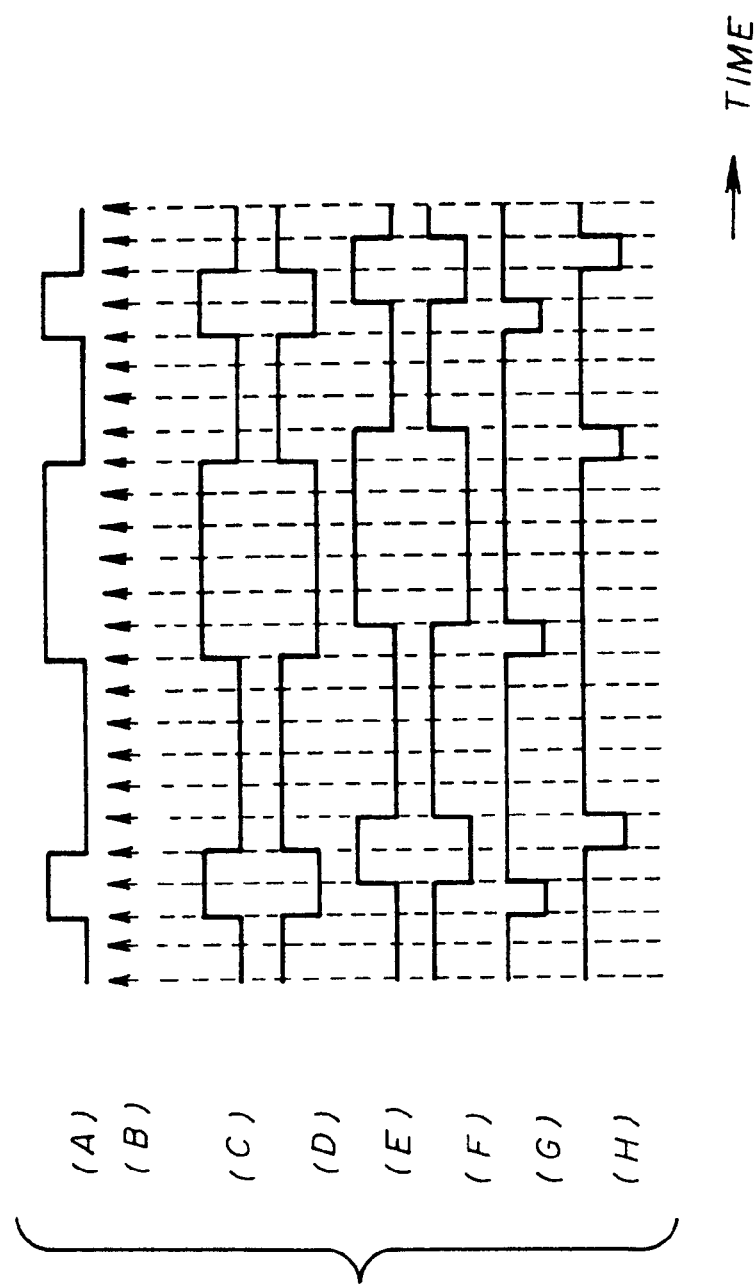
FIG. 18 is a timing chart for explaining the operation of the edge detection circuit.

FIG. 17 is a diagram showing the construction of an embodiment of an edge detection circuit of the detector 31, and FIGS. 18(A) through (H) are timing charts for explaining the operation of the edge detection circuit.

In FIG. 17, a latched modulated data shown in FIG. 18(A) which is output from the latch 31a is input to a data input terminal D of a D-type flip-flop 31b. A sampling clock signal shown in FIG. 18(B) is input to clock terminals C of this flip-flop 31b and a D-type flip-flop 31c. A Q-output of the flip-flop 31b shown in FIG. 18(C) is input to a data input terminal D of the flip-flop 31c. A NAND gate 31d receives the Q-output of the flip-flop 31b and a *Q-output (/Q or Q-bar-output) of the flip-flop 31c shown in FIG. 18(F). A NAND gate 31e receives a Q-output of the flip-flop 31c shown in FIG. 18(E) and a *Q-output of the flip-flop 31b shown in FIG. 18(D). The NAND gate 31d outputs a rising edge detection signal shown in FIG. 18(G), and the NAND gate 31e outputs a falling edge detection signal shown in FIG. 18(H).

Accordingly, the modulated data shown in FIG. 18(A) is sampled at the timing of the sampling clock signal shown in FIG. 18(B). When the modulated data is latched by the flip-flop 31b responsive to the sampling clock signal, the Q-output of this flip-flop 31b shown in FIG. 18(C) has a waveform which is approximately the same as that of the modulated data. The *Q-output of the flip-flop 31b shown in FIG. 18(D) is an inverted signal of the Q-output of the flip-flop 31b shown in FIG. 18(C).

The Q-output of the flip-flop 31b is latched by the flip-flop 31c responsive to the sampling clock signal. As a result, the Q-output of the flip-flop 31c shown in FIG. 18(E) is delayed by 1 sampling clock relative to the Q-output of the flip-flop 31b. The *Q-output of the flip-flop 31c shown in FIG. 18(F) is an inverted signal of the Q-output of the flip-flop 31c shown in FIG. 18(E). The NAND gate 31d obtains a logical product of the signals shown in FIGS. 18(C) and 18(F), and outputs the rising edge detection signal having the waveform shown in FIG. 18(G). On the other hand, the NAND gate 31e obtains a logical product of the signals shown in FIGS. 18(D) and 18(E), and outputs the falling edge detection signal having the waveform shown in FIG. 18(H).

Figure 19:
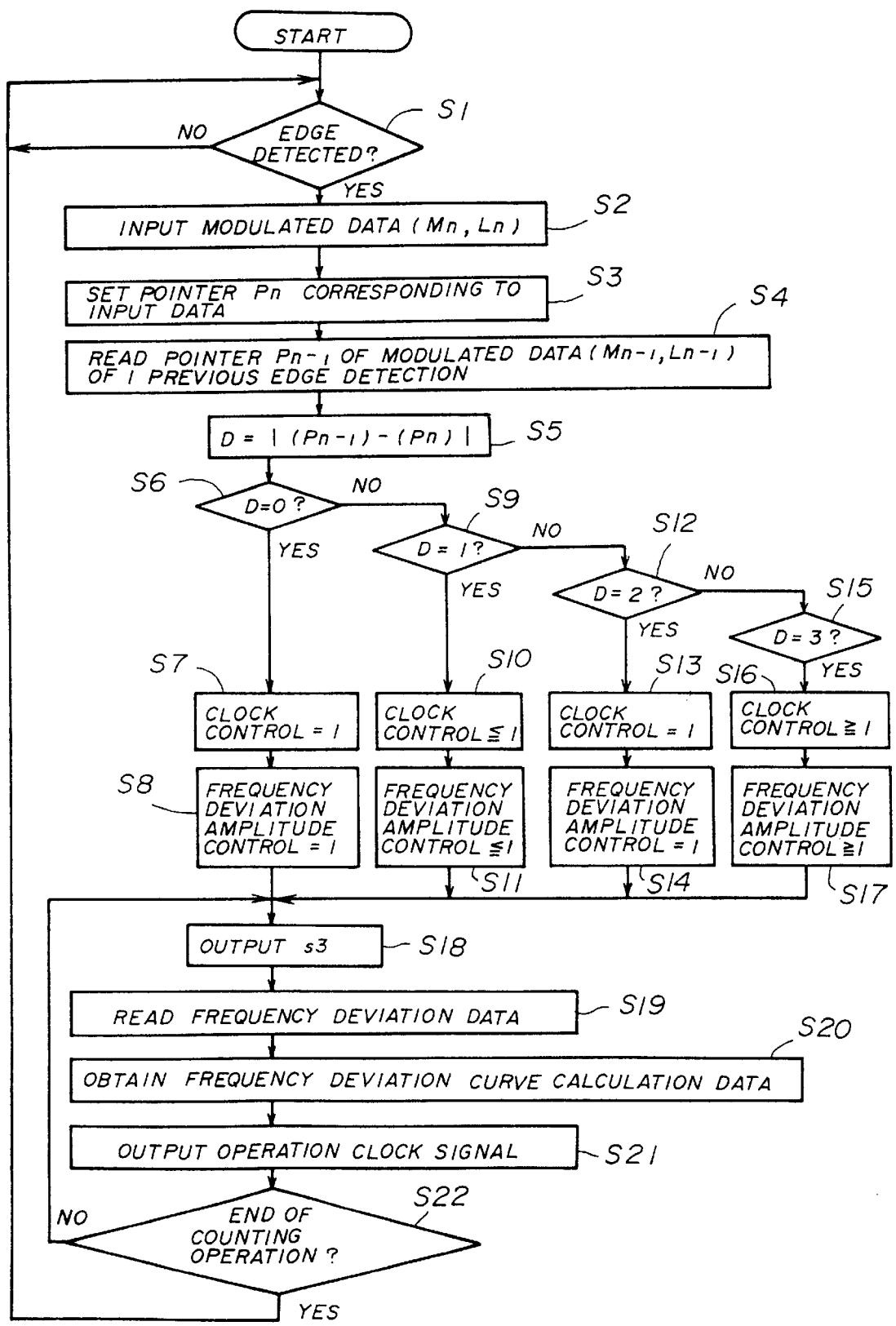
FIG. 19 is a flow chart for explaining the operation of a DSP in the first embodiment.

FIG. 19 is a flow chart for explaining the operation of the DSP 40 in this first embodiment. In FIG. 19, a step S1 decides whether or not the edge of the modulated data is detected by the data analyzer 30. If the decision result in the step S1 is YES, a step S2 inputs the demodulated data ($M_n$, $L_n$). In this embodiment, the modulated data are input via the 2 signal lines M and L, and the modulated data input via the line M is denoted by $M_n$ and the modulated data input via the line L is denoted by $L_n$.

Figure 20:
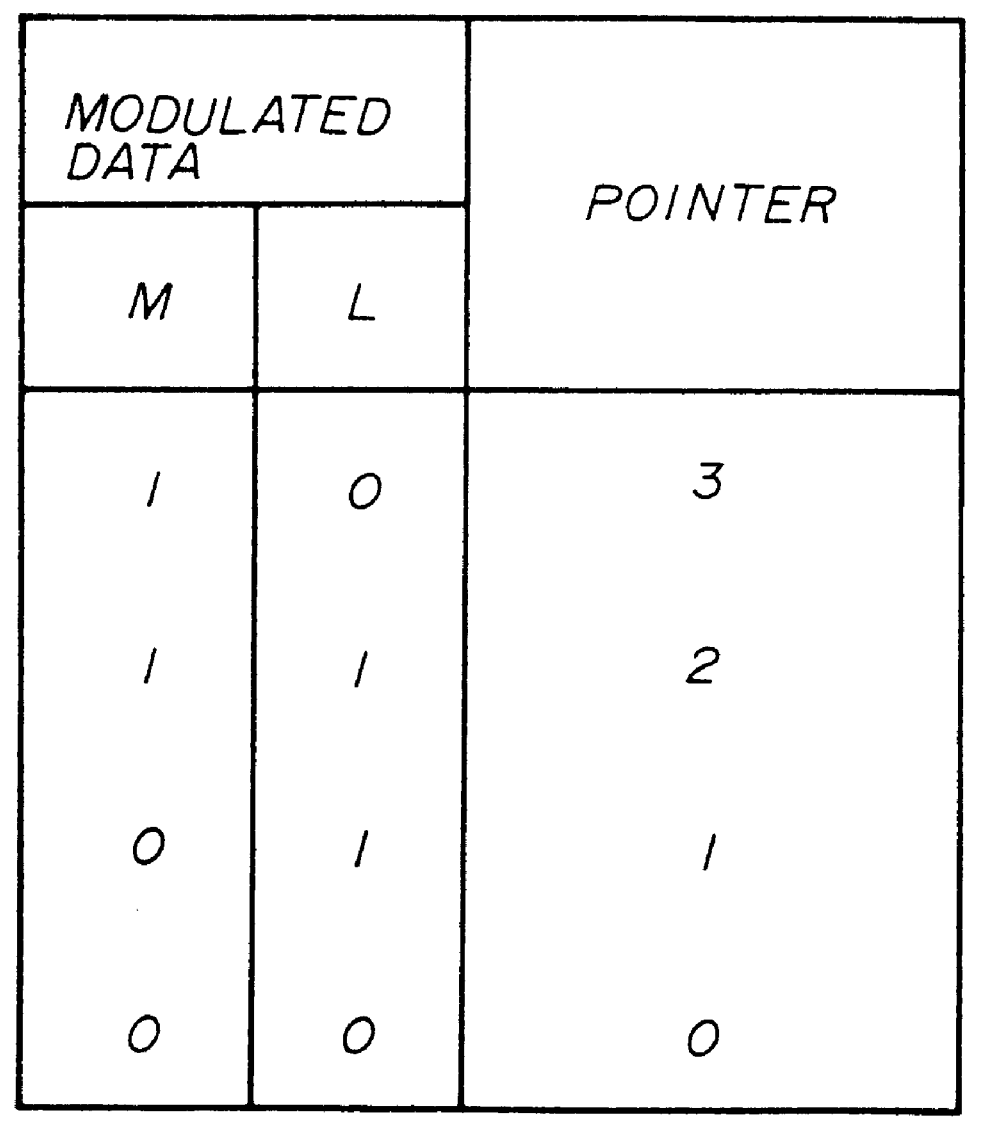

After the modulated data is input, a step S3 sets a pointer $P_n$ with respect to the input modulated data. FIG. 20 is a diagram showing a pointer of the modulated data. Since the modulated data is represented by $M_n$ and $L_n$, it is possible to distinguish 2 bits of data. In other words, it is possible to distinguish 4 data "0" through "3". Hence, pointers "0" through "3" can be set by the combination of M and L as shown in FIG. 20.

Next, a step S4 reads a pointer $P_{n-}$ of the modulated data ($M_{n-1}$, $L_{n-1}$) at the time of one previous edge detection.

After reading the pointer $P_{n-1}$, a step S5 obtains an absolute value D of a difference between the pointers $P_n$ and $P_{n-1}$ based on the following formula (3).

$$D=|(P_{n-1})-(P_n)| \tag{3}$$

Different frequency deviation amplitude (width) control operation and/or frequency deviation time control are carried out depending on the value of the obtained absolute value D. A step S6 decides whether or not D=0, and a step S9 decides whether or not D=1 if the decision result in the step S6 is NO. A step S12 decides whether or not D=2 if the decision result in the step S9 is NO. In addition, a step S15 decides whether or not D=3 if the decision result in the step S12 is NO.

When D=0 and the decision result in the step S6 is YES, a step S7 sets the clock control to 1, and a step S8 sets the frequency deviation amplitude (width) control to 1. The value Δt1 shown in FIG. 8A is used as a clock control time Δt by setting the clock control to 1. In addition, the value Δf1 shown in FIG. 8A is used as a frequency deviation Δf by setting the frequency deviation amplitude (width) control to 1.

On the other hand, when D=1 and the decision result in the step S9 is YES, a step S10 sets the clock control to 1 or less, and a step S11 sets the frequency deviation amplitude (width) control to 1 or less. A value less than or equal to the value Δt1 shown in FIG. 8A is used as the clock control time Δt by setting the clock control to 1 or less. In addition, a value less than or equal to the value Δf1 shown in FIG. 8A is used as the frequency deviation Δf by setting the frequency deviation amplitude (width) control to 1 or less.

When D=2 and the decision result in the step S12 is YES, a step S13 sets the clock control to 1, and a step S14 sets the frequency deviation amplitude (width) control to 1. The value Δt1 shown in FIG. 8A is used as a clock control time Δt by setting the clock control to 1. In addition, the value Δf1 shown in FIG. 8A is used as a frequency deviation Δf by setting the frequency deviation amplitude (width) control to 1.

Further, when D=3 and the decision result in the step S15 is YES, a step S16 sets the clock control to 1 or greater, and a step S17 sets the frequency deviation amplitude (width) control to 1 or greater. A value greater than or equal to the value Δt1 shown in FIG. 8A is used as the clock control time Δt by setting the clock control to 1 or greater. In addition, a value greater than or equal to the value Δf1 shown in FIG. 8A is used as the frequency deviation Δf by setting the frequency deviation amplitude (width) control to 1 or greater.

OF course, it is possible to carry out only the step S7, S10, S13 or S16 to set the clock control or, to carry out only the step S8, S11, S14 or S17 to set the frequency deviation amplitude (width) control, when determining the frequency deviation data operation parameters depending on the absolute value D.

After the frequency deviation data operation parameters are determined depending on the absolute value D, the DSP 40 outputs the address count control signal s3 in a step S18 and updates the counted value of the address counter 32a by 1. Next, a step S19 reads the frequency deviation data stored in the memory 32b with respect to the address.

With respect to the standard frequency deviation data read from the memory 32a, a step S20 obtains a frequency deviation curve calculation data based on the following formula (4) using the frequency deviation data operation parameters obtained by the above described process, where the frequency deviation data operation parameters are the frequency deviation Δf and the clock control time Δt described above.

(Frequency deviation curve calculation data) = (4)
(Frequency deviation data operation parameter) ×
(Frequency deviation data)

When the frequency deviation curve calculation data is obtained, a step S21 outputs an operation clock signal of the D/A converter 50. Then, a step S22 decides whether or not the counting operation of the address counter 32a has ended. It is possible to judge whether or not the counting operation of the address counter 32a has ended, based on the count end signal s4 which is supplied from the address counter 32a to the DSP 40. If the decision result in the step S22 is NO, the process returns to the step S18 so as to update the counted value of the address counter 32a. On the other hand, the process returns to the step S1 if the decision result in the step S22 is YES, so as to start the operation of detecting the edge of the modulated data.

According to this embodiment, the DSP 40 carries out the frequency deviation amplitude (width) control operation or, the frequency deviation time control operation or., the frequency deviation amplitude (width) control operation and the frequency deviation time control operation by making the operation process with respect to the frequency deviation data output from the memory 32b, using the predetermined frequency deviation data operation parameters. As a result, it is possible to carry out a frequency deviation which is advantageous to the receiver while satisfying the standard of the leakage power to the adjacent channel.

In this embodiment, the clock control time Δt and the frequency deviation Δf are used as the frequency deviation data operation parameters. However, it is of course possible to use one of the clock control time Δt and the frequency deviation Δf as the frequency deviation data operation parameter.

Further, this embodiment can minimize the scale of the frequency deviation data to be stored in the memory 32b because the standard frequency deviation curve is stored in the memory 32b and the actual frequency deviation data is obtained by carrying out the operation process with respect to this standard frequency deviation curve by the DSP 40.

Figure 21:
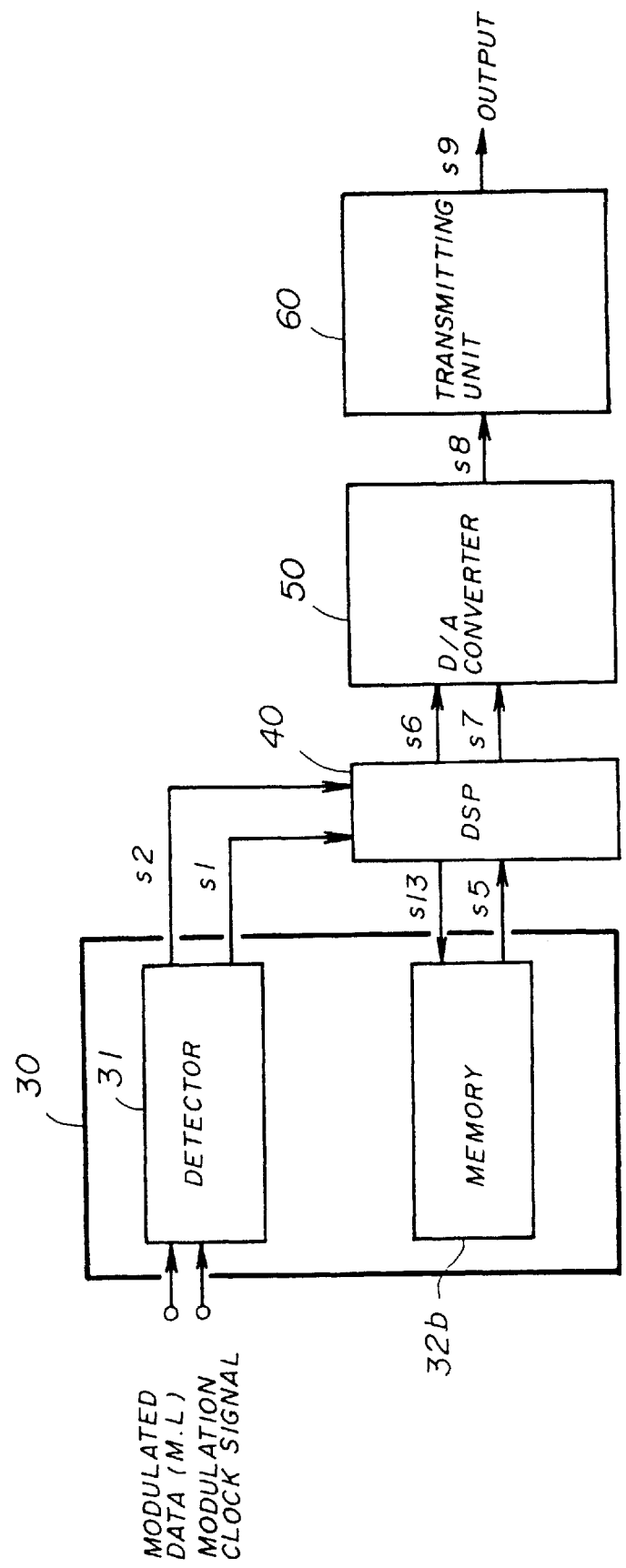
FIG. 21 is a system block diagram showing a second embodiment of the modulation system according to the present invention.

FIG. 21 is a system block diagram showing a second embodiment of the modulation system according to the present invention. This embodiment employs another memory storage analysis method. In FIG. 21, those parts which are the same as those corresponding parts in FIG. 15 are designated by the same reference numerals, and corresponding parts in FIG. 15 are used for those parts the illustration of which is omitted in FIG. 21.

The modulation system shown in FIG. 21 includes the data analyzer 30, the DSP 40, the D/A converter 50 and the transmitting unit 60. The data analyzer 40 includes the detector 31 which latches and detects the edge of the modulated data responsive to the input of the modulated data and the modulation clock signal, and the memory 32b which stores the standard frequency deviation curve such as that shown in FIG. 8A.

The DSP 40 receives the edge detection signal s1 and the detection data s2 from the detector 31. The DSP 40 supplies an address update signal s13 to the memory 32b, and receives the frequency deviation data s5 from the memory 32b. The D/A converter 50 receives the frequency deviation curve calculation data write timing clock signal s6 and the frequency deviation curve calculation data s7 from the DSP 40. The D/A converter 50 converts the frequency deviation curve calculation data s7 into an analog signal in synchronism with the clock signal s6. The transmitting unit 60 transmits the output (modulated wave) of the D/A converter 50. The transmitting output signal s9 having only the predetermined frequency component is extracted from the modulated wave and transmitted from the transmitting unit 60.

The circuit operation of the modulation system shown in FIG. 21 is as follows. That is, when the modulation clock signal and the modulated data are input to the data analyzer 30, the detector 31 latches and detects the edge of the modulated data. The detector 31 supplies the detected modulated data to the DSP 40. The DSP 40 computes the frequency deviation data based on the detected modulated data. More particularly, the DSP 40 compares the previous modulated data previously latched by the detector 31 and the present modulation data, and recognizes the direction of the frequency deviation. In addition, the DSP 40 carries out a predetermined operation process with respect to the standard frequency deviation data stored in the memory 32b, so as to calculate the frequency deviation curve. This frequency deviation curve is obtained by supplying the address updated signal s13 from the DSP 40 to the memory 32b to read the standard frequency deviation data stored at the corresponding address, and carrying out the predetermined operation process with respect to the read standard frequency deviation data.

In this case, the frequency deviation width magnification is multiplied to the frequency deviation data when carrying out the frequency deviation amplitude (width) control operation described above in conjunction with FIG. 8B, and the frequency deviation time magnification is multiplied to the frequency deviation data to control the output data time when carrying out the frequency deviation time control operation described above in conjunction with FIG. 8C. The data (modulated wave) which is subjected to the operation in the DSP 40 is converted into the analog modulated wave in synchronism with the clock signal s6 by the D/A converter 50. The output modulated wave of the D/A converter 50 is input to the transmitting unit 60 which extracts only the predetermined frequency component and outputs the predetermined frequency component as the transmitting output signal s9.

Figure 22:
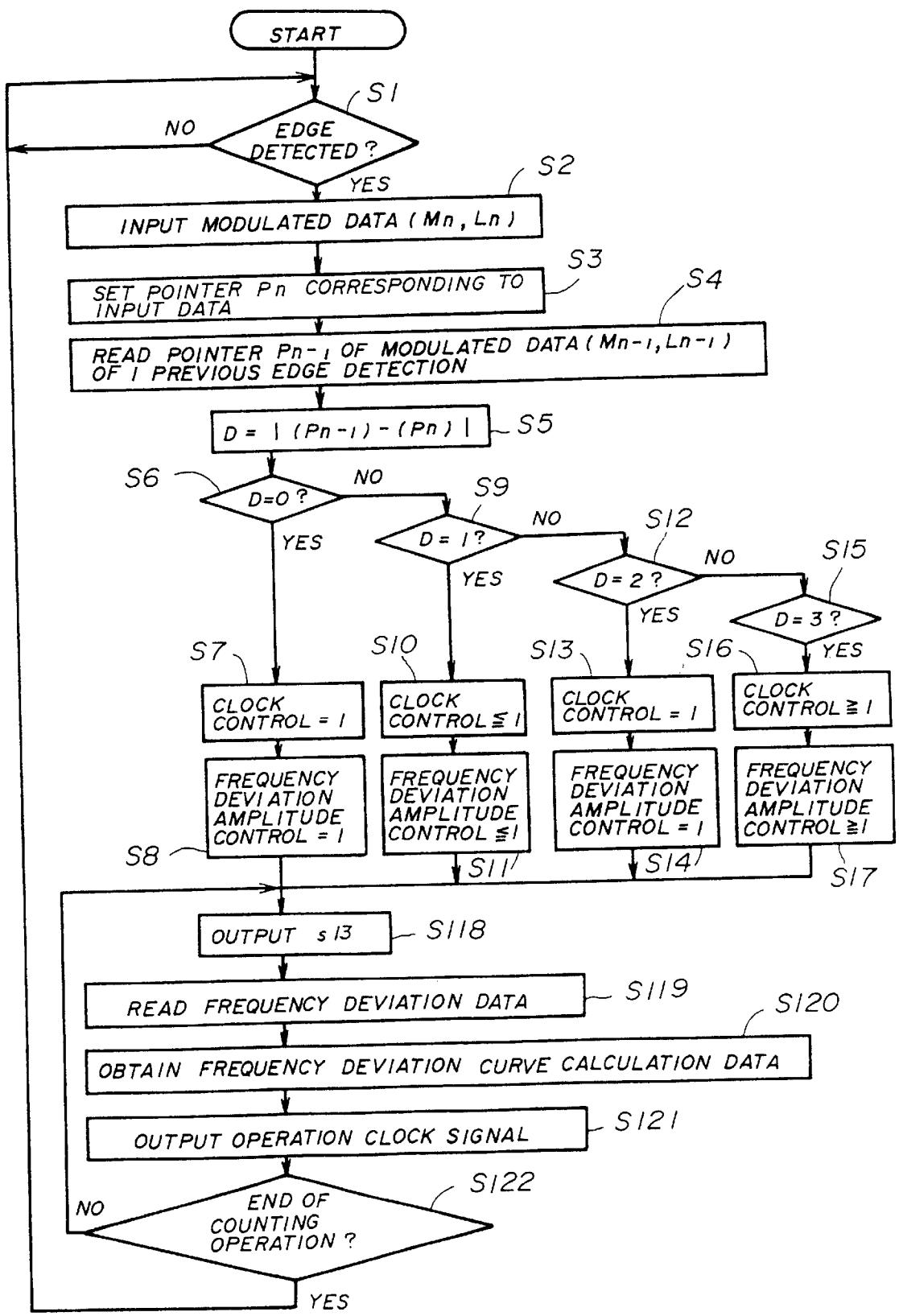
FIG. 22 is a flow chart for explaining the operation of the DSP in the second embodiment.

FIG. 22 is a flow chart for explaining the operation of the DSP 40 in this second embodiment. In FIG. 22, a step S1 decides whether or not the edge of the modulated data is detected by the data analyzer 30. If the decision result in the step S1 is YES, a step S2 inputs the demodulated data ($M_n$, $L_n$). In this embodiment, the modulated data are input via the 2 signal lines M and L, and the modulated data input via the line M is denoted by $M_n$ and the modulated data input via the line L is denoted by $L_n$.

After the modulated data is input, a step S3 sets a pointer $P_n$ with respect to the input modulated data. FIG. 20 shows a pointer of the modulated data. Since the modulated data is represented by $M_n$ and $L_n$, it is possible to distinguish 2 bits of data. In other words, it is possible to distinguish 4 data "0" through "3". Hence, pointers "0" through "3" can be set by the combination of M and L as shown in FIG. 20.

Next, a step S4 reads a pointer $P_{n-1}$ of the modulated data ($M_{n-1}$, $L_{n-1}$) at the time of one previous edge detection. After reading the pointer $P_{n-1}$, a step S5 obtains an absolute value D of a difference between the pointers $P_n$ and $P_{n-1}$ based on the formula (3) described above.

Different frequency deviation amplitude (width) control operation and/or frequency deviation time control are carried out depending on the value of the obtained absolute value D. A step S6 decides whether or not D=0, and a step S9 decides whether or not D=1 if the decision result in the step S6 is NO. A step S12 decides whether or not D=2 if the decision result in the step S9 is NO. In addition, a step S15 decides whether or not D=3 if the decision result in the step S12 is NO.

When D=0 and the decision result in the step S6 is YES, a step S7 sets the clock control to 1, and a step S8 sets the frequency deviation amplitude (width) control to 1. The value Δt1 shown in FIG. 8A is used as a clock control time Δt by setting the clock control to 1. In addition, the value Δf1 shown in FIG. 8A is used as a frequency deviation Δf by setting the frequency deviation amplitude (width) control to 1.

On the other hand, when D=1 and the decision result in the step S9 is YES, a step S10 sets the clock control to 1 or less, and a step S11 sets the frequency deviation amplitude (width) control to 1 or less. A value less than or equal to the value Δt1 shown in FIG. 8A is used as the clock control time Δt by setting the clock control to 1 or less. In addition, a value less than or equal to the value Δf1 shown in FIG. 8A is used as the frequency deviation Δf by setting the frequency deviation amplitude (width) control to 1 or less.

When D=2 and the decision result in the step S12 is YES, a step S13 sets the clock control to 1, and a step S14 sets the frequency deviation amplitude (width) control to 1. The value Δt1 shown in FIG. 8A is used as a clock control time Δt by setting the clock control to 1. In addition, the value Δf1 shown in FIG. 8A is used as a frequency deviation Δf by setting the frequency deviation amplitude (width) control to 1.

Further, when D=3 and the decision result in the step S15 is YES, a step S16 sets the clock control to 1 or greater, and a step S17 sets the frequency deviation amplitude (width) control to 1 or greater. A value greater than or equal to the value Δt1 shown in FIG. 8A is used as the clock control time Δt by setting the clock control to 1 or greater. In addition, a value greater than or equal to the value Δf1 shown in FIG. 8A is used as the frequency deviation Δf by setting the frequency deviation amplitude (width) control to 1 or greater.

Of course, it is possible to carry out only the step S7, S10, S13 or S16 to set the clock control or, to carry out only the step S8, S11, S14 or S17 to set the frequency deviation amplitude (width) control, when determining the frequency deviation data operation parameters depending on the absolute value D.

After the frequency deviation data operation parameters are determined depending on the absolute value D, the DSP 40 outputs an address update signal s13 in a step S118, and reads the frequency deviation data stored at the corresponding address of the memory 32b in a step Sl9. Next, with respect to the frequency deviation data read from the memory 32a, a step S120 obtains a frequency deviation curve calculation data based on the formula (4) described above using the frequency deviation data operation parameters obtained by the above described process, where the frequency deviation data operation parameters are the frequency deviation Δf and/or the clock control time Δt described above.

When the frequency deviation curve calculation data is obtained, a step S121 outputs an operation clock signal of the D/A converter 50. Then, a step S122 decides whether or not the counting operation of the address counter 32a has ended, based on the count end signal s4 which is supplied from the address counter 32a to the DSP 40. If the decision result in the step S122 is NO, the process returns to the step S18 so as to update the counted value of the address counter 32a. On the other hand, the process returns to the step S1 if the decision result in the step S122 is YES, so as to start the operation of detecting the edge of the modulated data.

According to this embodiment, the DSP 40 carries out the frequency deviation amplitude (width) control operation or the frequency deviation time control operation by making the operation process with respect to the frequency deviation data output from the memory 32b, using the predetermined frequency deviation data operation parameters. As a result, it is possible to carry out a frequency deviation which is advantageous to the receiver while satisfying the standard of the leakage power to the adjacent channel.

In addition, this embodiment can improve the leakage power to the adjacent channel and the demodulation condition by outputting the optimum frequency deviation for each frequency deviation. Further, this embodiment can minimize the scale of the frequency deviation data to be stored in the memory 32b because the standard frequency deviation curve is calculated by the DSP 40. Moreover, even in the case of the multiple-value (or multi-level value) frequency deviation, it is possible to obtain the above described effects by use of a circuit similar to that described above.

Figure 23:
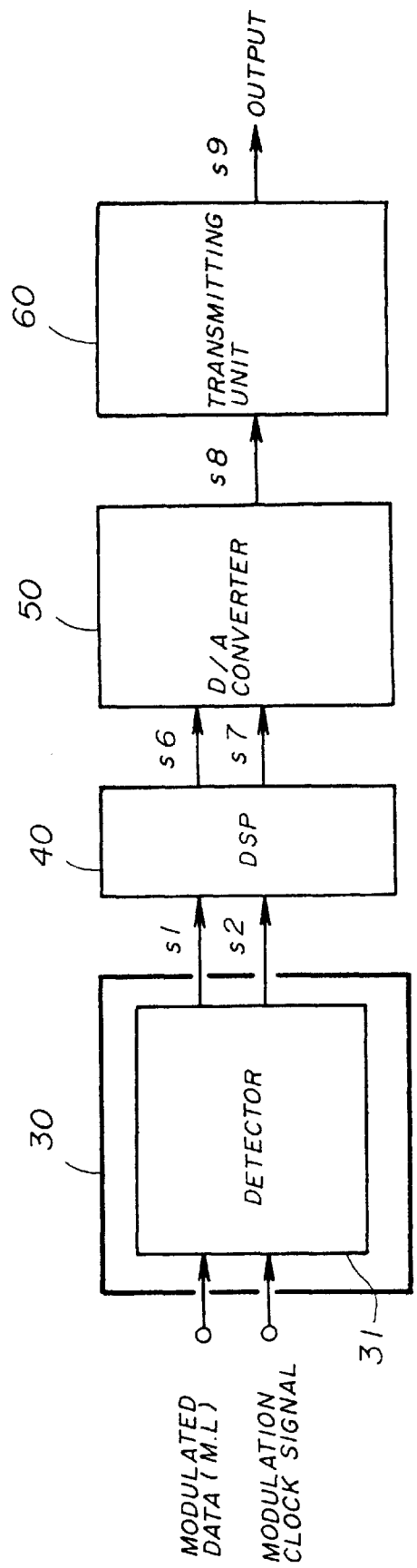
FIG. 23 is a system block diagram showing a third embodiment of the modulation system according to the present invention.

FIG. 23 is a system block diagram showing a third embodiment of the modulation system according to the present invention. This embodiment employs a DSP real-time processing method. In FIG. 23, those parts which are the same as those corresponding parts in FIG. 15 are designated by the same reference numerals, and corresponding parts in FIG. 15 are used for those parts the illustration of which is omitted in FIG. 23.

The modulation system shown in FIG. 23 includes the data analyzer 30, the DSP 40, the D/A converter 50 and the transmitting unit 60. The data analyzer 40 includes the detector 31 which latches and detects the edge of the modulated data responsive to the input of the modulated data and the modulation clock signal.

The DSP 40 receives the edge detection signal s1 and the detection data s2 from the detector 31. The DSP 40 supplies the frequency deviation curve calculation data write timing clock signal s6 and the frequency deviation curve calculation data s7 to the D/A converter 50. The D/A converter 50 converts the frequency deviation curve calculation data s7 into an analog signal in synchronism with the clock signal s6. The transmitting unit 60 transmits the output (modulated wave) of the D/A converter 50. The transmitting output signal s9 having only the predetermined frequency component is extracted from the modulated wave and transmitted from the transmitting unit 60.

The circuit operation of the modulation system shown in FIG. 23 is as follows. That is, when the modulation clock signal and the modulated data are input to the data analyzer 30, the detector 31 latches and detects the edge of the modulated data. The detector 31 supplies the detected modulated data to the DSP 40. The DSP 40 computes the frequency deviation data based on the detected modulated data. More particularly, the DSP 40 compares the previous modulated data previously latched by the detector 31 and the present modulation data, and recognizes the direction of the frequency deviation.

After the direction of the frequency deviation is recognized, the DSP 40 computes the standard frequency deviation data, and then calculates the frequency deviation curve by computing the frequency deviation width and the frequency deviation time with respect to the standard frequency deviation data. More particularly, the frequency deviation width magnification is multiplied to the frequency deviation data when carrying out the frequency deviation amplitude (width) control operation, and the frequency deviation time magnification is multiplied to the frequency deviation data when carrying out the frequency deviation time control operation. The DSP 40 supplies to the D/A converter 50 the frequency deviation curve calculation data s7 and the frequency deviation curve calculation data write timing clock s6 which are obtained in this manner. The D/A converter 50 converts the frequency deviation curve calculation data s7 into the analog signal in synchronism with the clock signal s6. The modulated wave s8 from the D/A converter 50 is input to the transmitting unit 60 which extracts only the predetermined frequency component and outputs the predetermined frequency component as the transmitting output signal s9.

Figure 24:
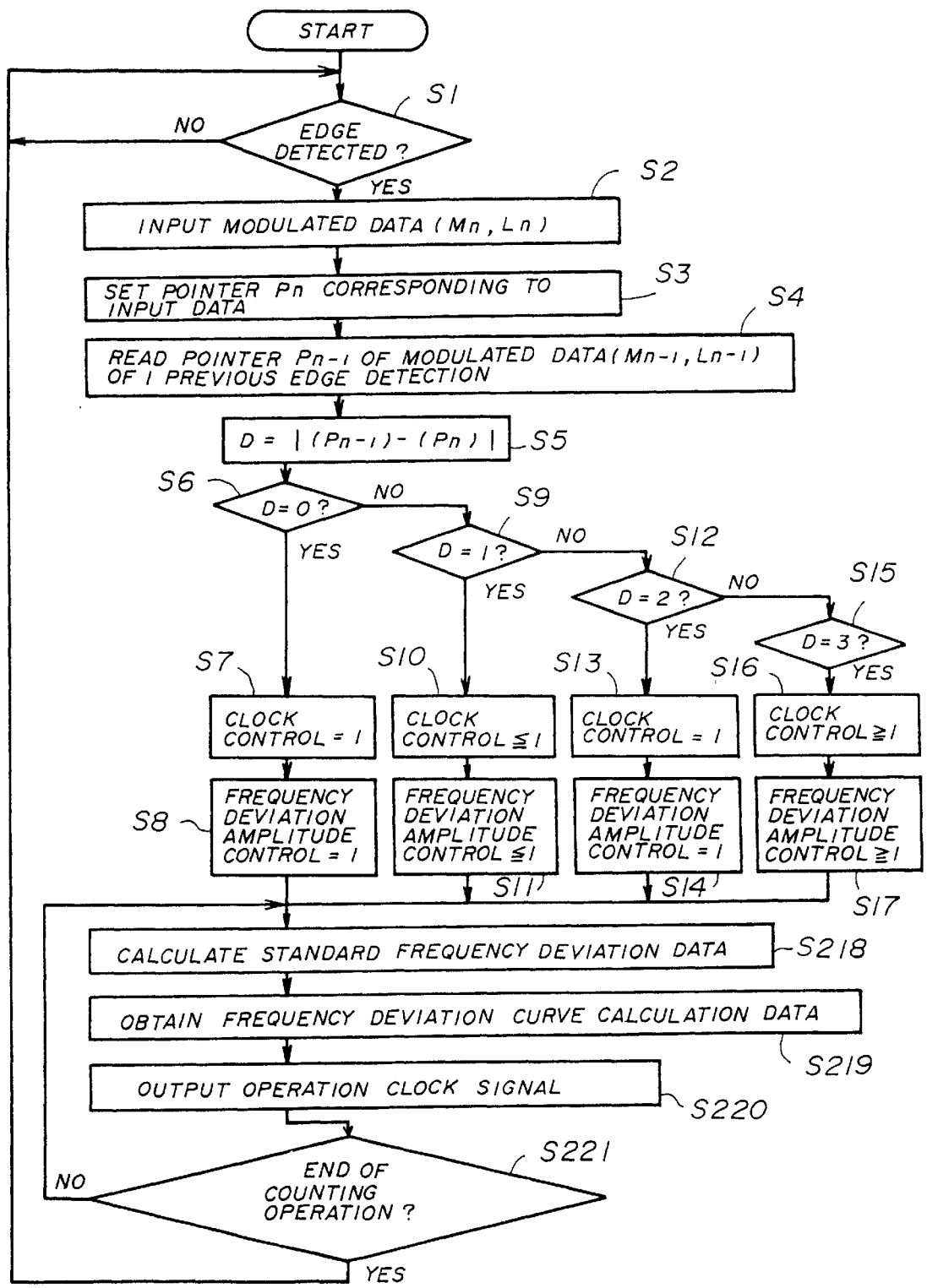
FIG. 24 is a flow chart for explaining the operation of the DSP in the third embodiment.

FIG. 24 is a flow chart for explaining the operation of the DSP 40 in this third embodiment. In FIG. 24, a step S1 decides whether or not the edge of the modulated data is detected by the data analyzer 30. If the decision result in the step S1 is YES, a step S2 inputs the demodulated data ($M_n$, $L_n$) In this embodiment, the modulated data are input via the 2 signal lines M and L, and the modulated data input via the line M is denoted by $M_n$ and the modulated data input via the line L is denoted by $L_n$.

After the modulated data is input, a step S3 sets a pointer $P_n$ with respect to the input modulated data. FIG. 20 shows a pointer of the modulated data. Since the modulated data is represented by $M_n$ and $L_n$, it is possible to distinguish 2 bits of data. In other words, it is possible to distinguish 4 data "0" through "3". Hence, pointers "0" through "3" can be set by the combination of M and L as shown in FIG. 20.

Next, a step S4 reads a pointer $P_{n-1}$ of the modulated data ($M_{n-1}$, $L_{n-1}$) at the time of one previous edge detection. After reading the pointer $P_{n-1}$, a step S5 obtains an absolute value D of a difference between the pointers $P_n$ and $P_{n-1}$ based on the formula (3) described above.

Different frequency deviation amplitude (width) control operation and/or frequency deviation time control are carried out depending on the value of the obtained absolute value D. A step S6 decides whether or not D=0, and a step S9 decides whether or not D=1 if the decision result in the step S6 is NO. A step S12 decides whether or not D=2 if the decision result in the step S9 is NO. In addition, a step S15 decides whether or not D=3 if the decision result in the step S12 is NO.

When D=0 and the decision result in the step S6 is YES, a step S7 sets the clock control to 1, and a step S8 sets the frequency deviation amplitude (width) control to 1. The value $\Delta t1$ shown in FIG. 8A is used as a clock control time $\Delta t$ by setting the clock control to 1. In addition, the value $\Delta f1$ shown in FIG. 8A is used as a frequency deviation $\Delta f$ by setting the frequency deviation amplitude (width) control to 1.

On the other hand, when D=1 and the decision result in the step S9 is YES, a step S10 sets the clock control to 1 or less, and a step S11 sets the frequency deviation amplitude (width) control to 1 or less. A value less than or equal to the value $\Delta t1$ shown in FIG. 8A is used as the clock control time $\Delta t$ by setting the clock control to 1 or less. In addition, a value less than or equal to the value $\Delta f1$ shown in FIG. 8A is used as the frequency deviation $\Delta f$ by setting the frequency deviation amplitude (width) control to 1 or less.

When D=2 and the decision result in the step S12 is YES, a step S13 sets the clock control to 1, and a step S14 sets the frequency deviation amplitude (width) control to 1. The value $\Delta t1$ shown in FIG. 8A is used as a clock control time $\Delta t$ by setting the clock control to 1. In addition, the value $\Delta f1$ shown in FIG. 8A is used as a frequency deviation $\Delta f$ by setting the frequency deviation amplitude (width) control to 1.

Further, when D=3 and the decision result in the step S15 is YES, a step S16 sets the clock control to 1 or greater, and a step S17 sets the frequency deviation amplitude (width) control to 1 or greater. A value greater than or equal to the value $\Delta t1$ shown in FIG. 8A is used as the clock control time $\Delta t$ by setting the clock control to 1 or greater. In addition, a value greater than or equal to the value $\Delta f1$ shown in FIG. 8A is used as the frequency deviation $\Delta f$ by setting the frequency deviation amplitude (width) control to 1 or greater.

Of course, it is possible to carry out only the step S7, S10, S13 or S16 to set the clock control or, to carry out only the step S8, S11, S14 or S17 to set the frequency deviation amplitude (width) control, when determining the frequency deviation data operation parameters depending on the absolute value D.

After the frequency deviation data operation parameters are determined depending on the absolute value D, the DSP 40 calculates the standard value of the frequency deviation data based on the detected data and the notification information regarding the input detection from the detector 31 (or CPU forming the data analyzer 30) in a step S218. In addition, a step S219 obtains the frequency deviation curve calculation data based on the formula (4) described above using the frequency deviation data operation parameters obtained by the above described process, with respect to the calculated standard frequency deviation data.

When the frequency deviation curve calculation data is obtained, a step S220 outputs an operation clock signal of the D/A converter 50. Then, a step S221 decides whether or not the counting operation of the address counter 32a has ended. If the decision result in the step S221 is NO, the process returns to the step S218 so as to calculate the standard frequency deviation data. On the other hand, the process returns to the step S1 if the decision result in the step S221 is YES, so as to start the operation of detecting the edge of the modulated data.

According to this embodiment, the DSP 40 carries out the frequency deviation amplitude (width) control operation or the frequency deviation time control operation by making the operation process with respect to the standard frequency deviation data output from the memory 32b, using the predetermined frequency deviation data operation parameters. As a result, it is possible to carry out a frequency deviation which is advantageous to the receiver while satisfying the standard of the leakage power to the adjacent channel.

In addition, this embodiment can judge the frequency deviation in real-time by carrying out the process directly with respect to the input modulated data, because the DSP 40 carries out a frequency deviation judging process in real-time. Moreover, this embodiment can improve the leakage power to the adjacent channel and the demodulation condition by outputting the optimum frequency deviation for each frequency deviation. Further, this embodiment can simplify the circuit construction because the standard frequency deviation curve is calculated by the DSP 40. Moreover, even in the case of the multiple-value (or multi-level value) frequency deviation, it is possible to obtain the above described effects by use of a circuit similar to that described above.

Figure 25:
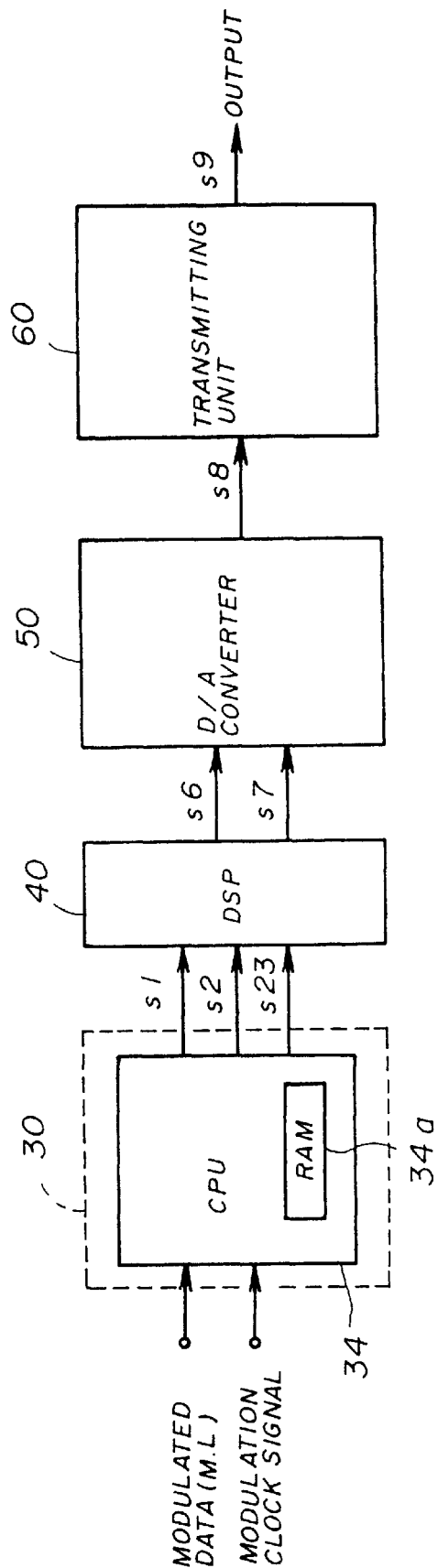
FIG. 25 is a system block diagram showing a fourth embodiment of the modulation system according to the present invention.

FIG. 25 is a system block diagram showing a fourth embodiment of the modulation system according to the present invention. In FIG. 25, those parts which are the same as those corresponding parts in FIG. 15 are designated by the same reference numerals, and corresponding parts in FIG. 15 are used for those parts the illustration of which is omitted in FIG. 25.

The modulation system shown in FIG. 25 includes the data analyzer 30, the DSP 40, the D/A converter 50 and the transmitting unit 60. The data analyzer 40 includes a CPU 34 and a random access memory (RAM) 34a which forms an internal memory of the CPU 34.

The data analyzer 30 outputs the edge detection signal s1, the detected data (Mn, Ln), and a modulated data comparison result s23 which are supplied to the DSP 40. The DSP 40 supplies the frequency deviation curve calculation data write timing clock signal s6 and the frequency deviation curve calculation data s7 to the D/A converter 50. The D/A converter 50 converts the frequency deviation curve calculation data s7 into an analog signal in synchronism with the clock signal s6. The transmitting unit 60 transmits the output (modulated wave) of the D/A converter 50. The transmitting output signal s9 having only the predetermined frequency component is extracted from the modulated wave and transmitted from the transmitting unit 60.

The circuit operation of the modulation system shown in FIG. 25 is as follows.

Figure 26:
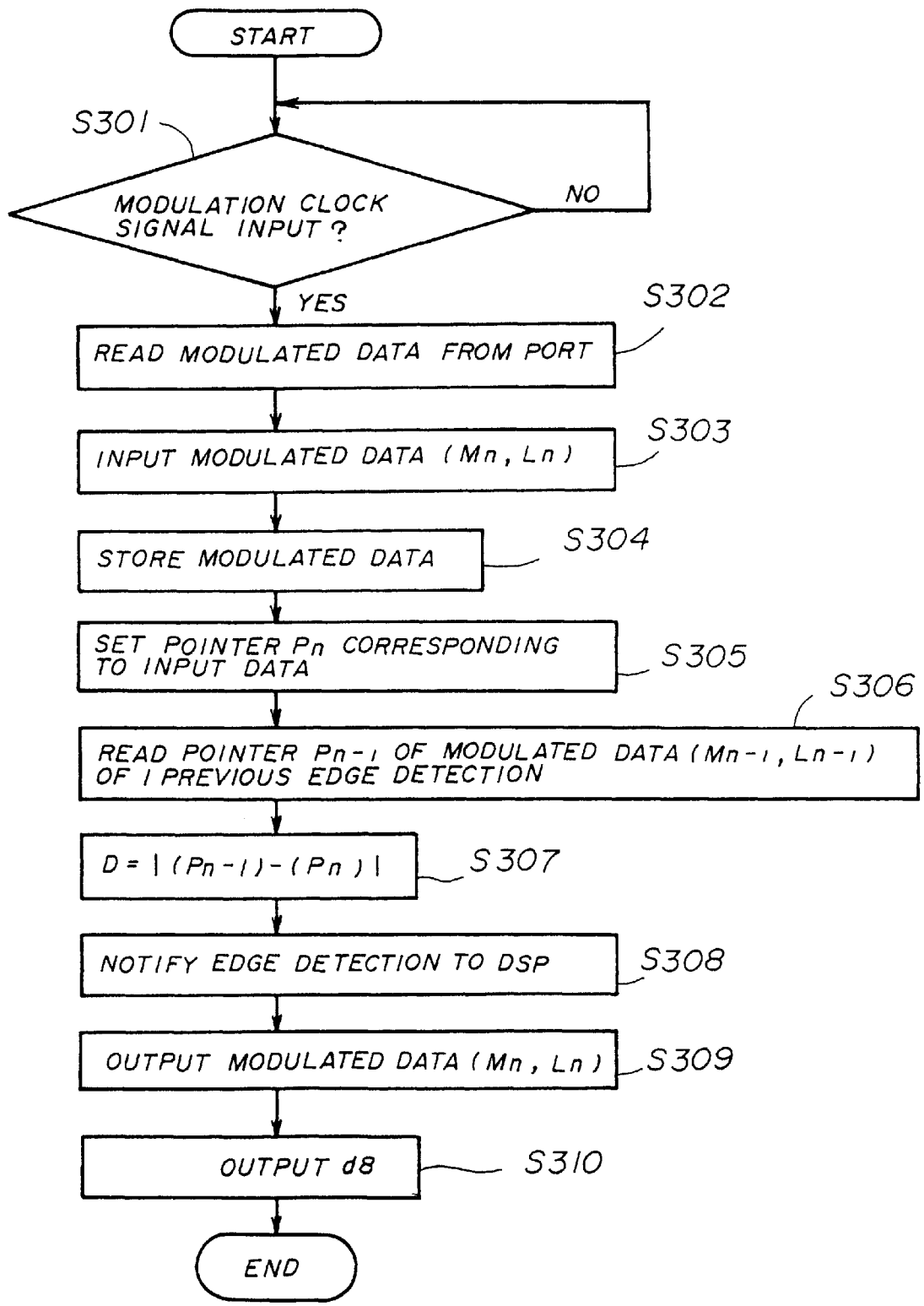
FIG. 26 is a flow chart for explaining the operation of the fourth embodiment.

FIG. 26 is a flow chart for explaining the operation of the CPU 34 in this fourth embodiment. In FIG. 26, the CPU 34 constantly monitors the input of the modulation clock signal and decides whether or not the modulation clock signal is input in a step S301. In this case, an interrupt port or the like of the CPU 34 may be used as an input part for receiving the modulation clock signal. When the CPU 34 detects the modulation clock signal and the decision result in the step S301 becomes YES, the CPU 34 reads the modulated data via a modulated data input port in a step S302. The read modulated data is stored in the internal RAM 34a as will be described later.

Next, the CPU 34 inputs the modulated data in a step S303, and stores the modulated data in the internal RAM 34a in a step S304. The CPU 34 sets a pointer $P_n$ with respect to the input modulated data in a step S305. The CPU 34 reads a pointer $P_{n-1}$ of the previous modulated data at the time when one previous edge detection was made in a step S306. Then, the CPU 34 obtains an absolute value D of a difference between the pointers $P_{n-1}$, and $P_n$ in a step S307. In a step S308, the CPU 34 notifies to the DSP 40 the input of the modulated data by the edge detection signal s1 and the modulated data comparison result s23 indicative of the result of the comparison of the modulated data s2 previously stored in the CPU 34 (internal RAM 34a) and the modulated data stored this time in the CPU 34.

In a step S309, the DSP 40 carries out a frequency deviation amplitude (width) control operation and a frequency deviation time control operation based on the comparison result s23 from the CPU 34, with respect to the calculated frequency deviation data, and outputs the frequency deviation curve calculation data write timing clock signal s6 and the frequency deviation curve calculation data s7 to the D/A converter 50. The frequency deviation width magnification is multiplied to the frequency deviation data in the case of the frequency deviation amplitude (width) control operation, and the frequency deviation time control operation is carried out. In this case, it is possible to control the output data time of the DSP 40 by the frequency deviation time magnification. In a step S310, the D/A converter 50 obtains the modulated data s8 from the data processed in the DSP 40, and outputs the modulated data s8 to the transmitting unit 60. The transmitting unit 60 outputs the transmitting output signal s9 in response to the modulated data s8 from the D/A converter 50.

Figure 27:
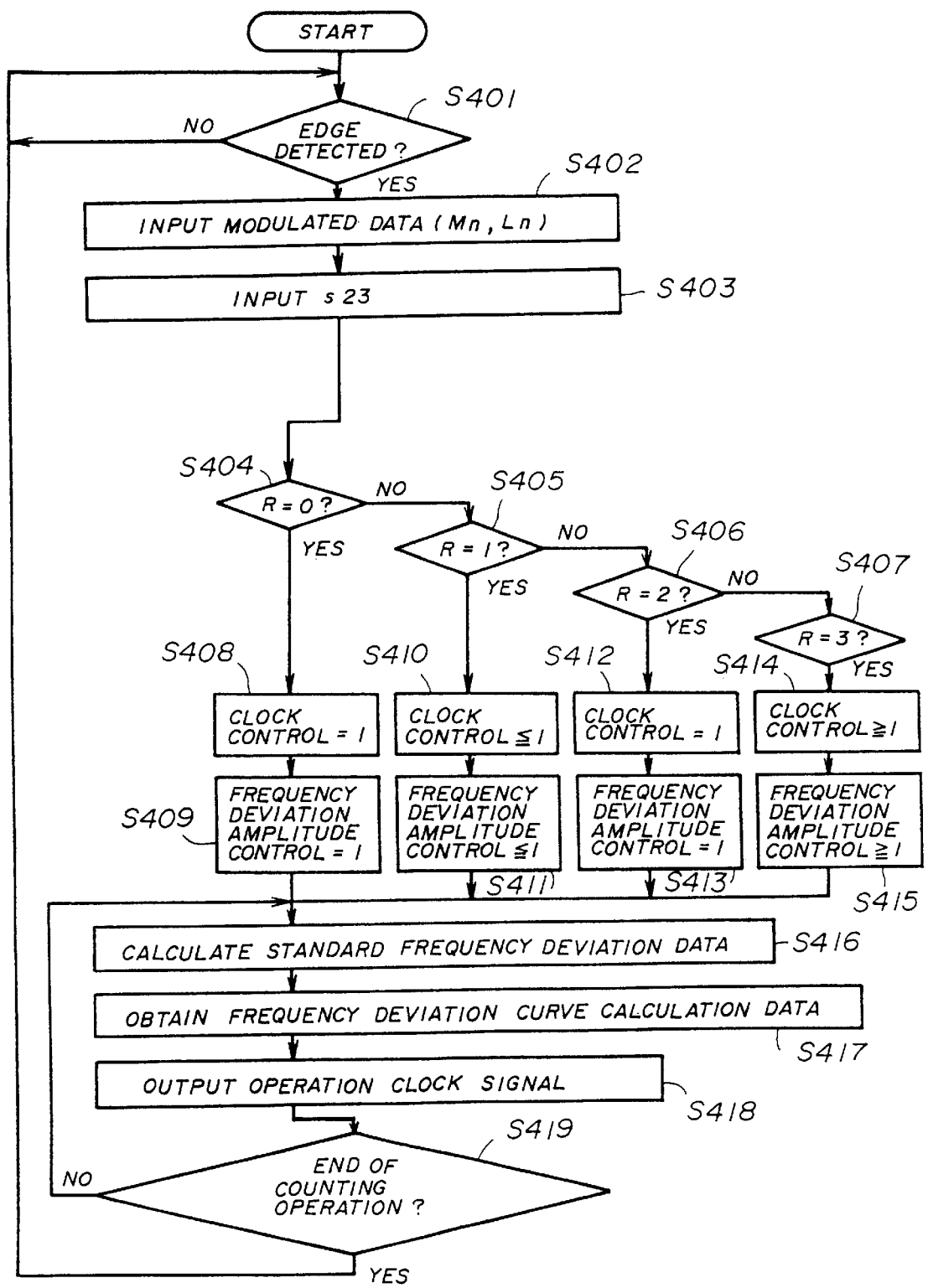
FIG. 27 is a flow chart for explaining the operation of the DSP in the fourth embodiment.

FIG. 27 is a flow chart for explaining the operation of the DSP 40 in this fourth embodiment. In FIG. 27, a step S401 decides whether or not the edge of the modulated data is detected by the data analyzer 30. If the decision result in the step S401 is YES, a step S402 inputs the demodulated data ($M_n$, $L_n$). In this embodiment, the modulated data are input via the 2 signal lines M and L, and the modulated data input via the line M is denoted by $M_n$ and the modulated data input via the line L is denoted by $L_n$.

After the modulated data is input, a step S403 inputs the modulated data comparison result s23 which will hereinafter be referred to as a value R.

Different frequency deviation amplitude (width) control operation and/or frequency deviation time control are carried out depending on the value of the obtained modulated data comparison result R. A step S404 decides whether or not R=0, and a step S405 decides whether or not R=1 if the decision result in the step S404 is NO. A step S406 decides whether or not R=2 if the decision result in the step S405 is NO. In addition, a step S407 decides whether or not R=3 if the decision result in the step S406 is NO.

When R=0 and the decision result in the step S404 is YES, a step S408 sets the clock control to 1, and a step S409 sets the frequency deviation amplitude (width) control to 1.

On the other hand, when R=1 and the decision result in the step S405 is YES, a step S410 sets the clock control to 1 or less, and a step S411 sets the frequency deviation amplitude (width) control to 1 or less.

When R=2 and the decision result in the step S406 is YES, a step S412 sets the clock control to 1, and a step S413 sets the frequency deviation amplitude (width) control to 1.

Further, when R=3 and the decision result in the step S407 is YES, a step S414 sets the clock control to 1 or greater, and a step S415 sets the frequency deviation amplitude (width) control to 1 or greater.

Of course, it is possible to carry out only the step S408, S410, S412 or S414 to set the clock control or, to carry out only the step S409, S411, S413 or S415 to set the frequency deviation amplitude (width) control, when determining the frequency deviation data operation parameters depending on the modulated data comparison result R.

After the frequency deviation data operation parameters are determined depending on the modulated data comparison result R, the DSP 40 calculates the standard value of the frequency deviation data based on the detected data and the notification information regarding the input detection from the CPU 34 in a step S416. In addition, a step S417 obtains the frequency deviation curve calculation data based on the formula (4) described above using the frequency deviation data operation parameters obtained by the above described process, with respect to the calculated standard frequency deviation data.

When the frequency deviation curve calculation data is obtained, a step S418 outputs an operation clock signal of the D/A converter 50. Then, a step S419 decides whether or not the counting operation of the address counter 32a has ended. If the decision result in the step S419 is NO, the process returns to the step S416 so as to calculate the standard frequency deviation data. On the other hand, the process returns to the step S401 if the decision result in the step S419 is YES, so as to start the operation of detecting the edge of the modulated data.

According to this embodiment, it is possible to improve the leakage power to the adjacent channel and the demodulation condition by outputting the optimum frequency deviation for each frequency deviation. Further, this embodiment can simplify the circuit construction because the standard frequency deviation curve is calculated by the DSP 40. Moreover, even in the case of the multiple-value (or multi-level value) frequency deviation, it is possible to obtain the above described effects by use of a circuit similar to that described above by adding a port to the CPU 34. The processing speed of the DSP 40 is also improved by distributing a part of the process to the CPU 34.

Figure 28:
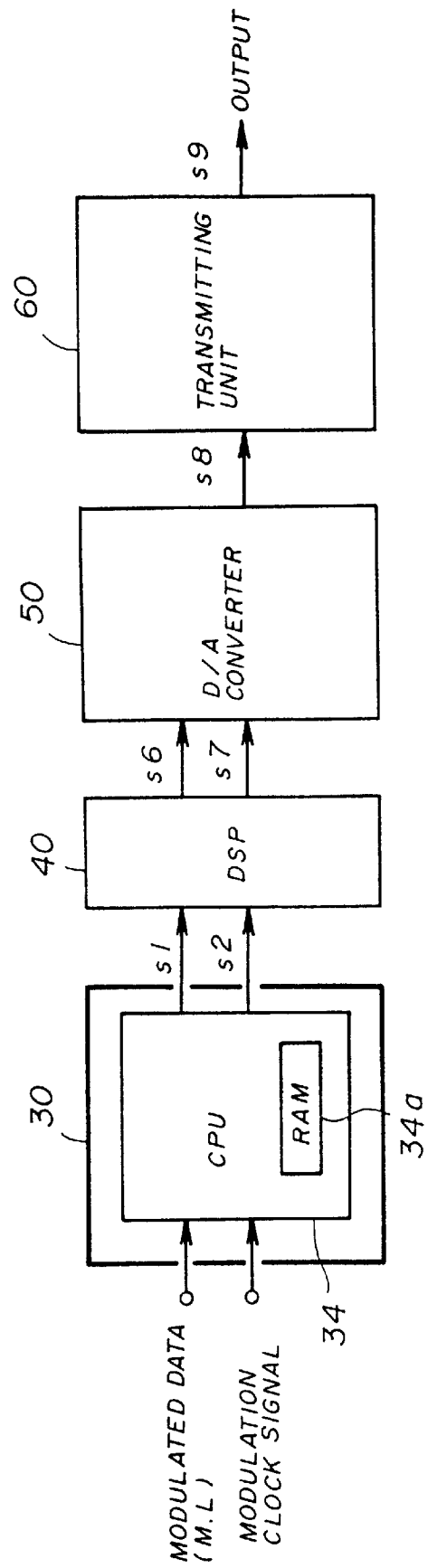
FIG. 28 is a system block diagram showing a fifth embodiment of the modulation system according to the present invention.

FIG. 28 is a system block diagram showing a fifth embodiment of the modulation system according to the present invention. In FIG. 28, those parts which are the same as those corresponding parts in FIG. 15 are designated by the same reference numerals, and corresponding parts in FIG. 15 are used for those parts the illustration of which is omitted in FIG. 28.

The modulation system shown in FIG. 28 includes the data analyzer 30, the DSP 40, the D/A converter 50 and the transmitting unit 60. The data analyzer 30 includes the CPU 34 and the RAM 34a which forms the internal memory of the CPU 34.

The data analyzer 30 outputs the edge detection signal s1 and the detected data (Mn, Ln) which are supplied to the DSP 40. The DSP 40 supplies the frequency deviation curve calculation data write timing clock signal s6 and the frequency deviation curve calculation data s7 to the D/A converter 50. The D/A converter 50 converts the frequency deviation curve calculation data s7 into an analog signal in synchronism with the clock signal s6. The transmitting unit 60 transmits the output (modulated wave) of the D/A converter 50. The transmitting output signal s9 having only the predetermined frequency component is extracted from the modulated wave and transmitted from the transmitting unit 60.

The circuit operation of the modulation system shown in FIG. 28 is as follows.

Figure 29:
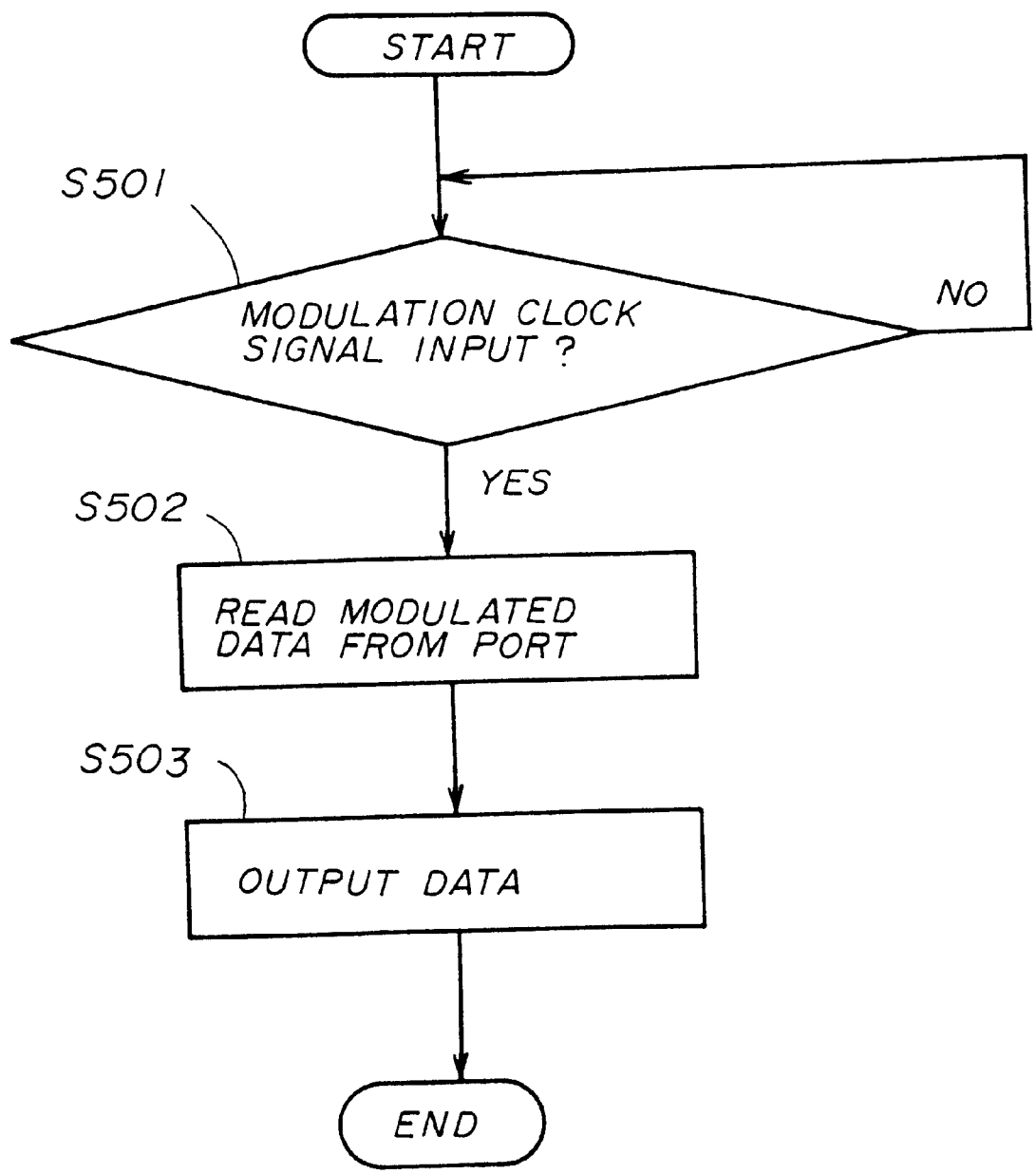
FIG. 29 is a flow chart for explaining the operation of a CPU in a fifth embodiment of the modulation system according to the present invention.

FIG. 29 is a flow chart for explaining the operation of the CPU 34 in this fifth embodiment. In FIG. 29, the CPU 34 constantly monitors the input of the modulation clock signal and decides whether or not the modulation clock signal is input in a step S501. In this case, an interrupt port or the like of the CPU 34 may be used as an input part for receiving the modulation clock signal. When the CPU 34 detects the modulation clock signal and the decision result in the step S501 becomes YES, the CPU 34 reads the modulated data via a modulated data input port in a step S502. The read modulated data is stored in the internal RAM 34a.

Next, the CPU 34 compares the read modulated data and the modulated data read 1 clock before, counts up an internal clock counter of the CPU 34 if the compared data are the same, and starts the internal clock counter if the compared data are not the same, in a step S503. The CPU 34 also notifies the detected modulated data, the notification regarding the input detection, and information regarding the counted value of the internal counter to the DSP 40 in the step S503.

The DSP 40 calculates the standard frequency deviation curve (frequency deviation data) based on the detected modulated data (M, L) when the edge detection signal s1 and the modulated data s2 are received from the CPU 34. In this case, the frequency deviation width magnification is multiplied to the frequency deviation data when carrying out a frequency deviation amplitude (width) control operation, and the frequency deviation time magnification is multiplied to the frequency deviation data when carrying out a frequency deviation time control operation. The DSP 40 outputs the frequency deviation curve calculation data write timing clock signal s6 and the frequency deviation curve calculation data s7 which are obtained this manner to the D/A converter 50. The D/A converter 50 obtains the modulated data s8 by converting the frequency deviation data into an analog signal in synchronism with the clock signal s6, and supplies the modulated data s8 to the transmitting unit 60. The transmitting unit 60 outputs the transmitting output signal s9 in response to the modulated data s8 from the D/A converter 50.

Figure 30:
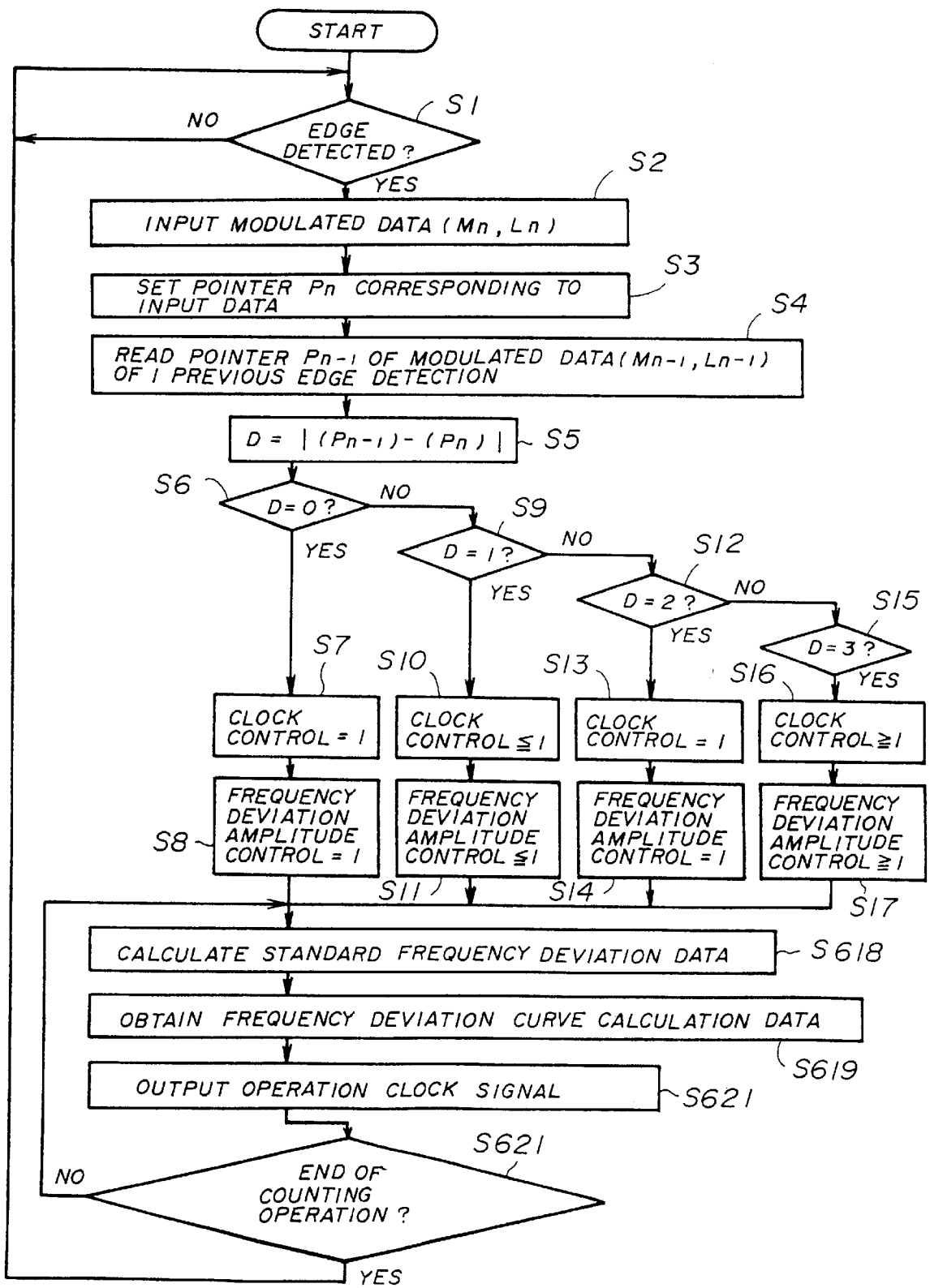
FIG. 30 is a flow chart for explaining the operation of the DSP in the fifth embodiment.

FIG. 30 is a flow chart for explaining the operation of the DSP 40 in this fifth embodiment. In FIG. 30, a step S1 decides whether or not the edge of the modulated data is detected by the data analyzer 30. If the decision result in the step S1 is YES, a step S2 inputs the demodulated data ($M_n$, $L_n$) In this embodiment, the modulated data are input via the 2 signal lines M and L, and the modulated data input via the line M is denoted by $M_n$ and the modulated data input via the line L is denoted by $L_n$.

After the modulated data is input, a step S3 sets a pointer $P_n$ with respect to the input modulated data. FIG. 20 shows a pointer of the modulated data. Since the modulated data is represented by $M_n$ and $L_n$, it is possible to distinguish 2 bits of data. In other words, it is possible to distinguish 4 data "0" through "3". Hence, pointers "0" through "3" can be set by the combination of M and L as shown in FIG. 20.

Next, a step S4 reads a pointer $P_{n-1}$ of the modulated data ($M_{n-1}$, $L_{n-1}$) at the time of one previous edge detection. After reading the pointer $P_{n-1}$, a step S5 obtains an absolute value D of a difference between the pointers $P_n$ and $P_{n-1}$ based on the formula (3) described above.

Different frequency deviation amplitude (width) control operation and/or frequency deviation time control are carried out depending on the value of the obtained absolute value D. A step S6 decides whether or not D=0, and a step S9 decides whether or not D=1 if the decision result in the step S6 is NO. A step S12 decides whether or not D=2 if the decision result in the step S9 is NO. In addition, a step S15 decides whether or not D=3 if the decision result in the step S12 is NO.

When D=0 and the decision result in the step S6 is YES, a step S7 sets the clock control to 1, and a step S8 sets the frequency deviation amplitude (width) control to 1. The value Δt1 shown in FIG. 8A is used as a clock control time Δt by setting the clock control to 1. In addition, the value Δf1 shown in FIG. 8A is used as a frequency deviation Δf by setting the frequency deviation amplitude (width) control to 1.

On the other hand, when D=1 and the decision result in the step S9 is YES, a step S10 sets the clock control to 1 or less, and a step S11 sets the frequency deviation amplitude (width) control to 1 or less. A value less than or equal to the value Δt1 shown in FIG. 8A is used as the clock control time Δt by setting the clock control to 1 or less. In addition, a value less than or equal to the value Δf1 shown in FIG. 8A is used as the frequency deviation Δf by setting the frequency deviation amplitude (width) control to 1 or less.

When D=2 and the decision result in the step S12 is YES, a step S13 sets the clock control to 1, and a step S14 sets the frequency deviation amplitude (width) control to 1. The value Δt1 shown in FIG. 8A is used as a clock control time Δt by setting the clock control to 1. In addition, the value Δf1 shown in FIG. 8A is used as a frequency deviation Δf by setting the frequency deviation amplitude (width) control to 1.

Further, when D=3 and the decision result in the step S15 is YES, a step S16 sets the clock control to 1 or greater, and a step S17 sets the frequency deviation amplitude (width) control to 1 or greater. A value greater than or equal to the value Δt1 shown in FIG. 8A is used as the clock control time Δt by setting the clock control to 1 or greater. In addition, a value greater than or equal to the value Δf1 shown in FIG. 8A is used as the frequency deviation Δf by setting the frequency deviation amplitude (width) control to 1 or greater.

Of course, it is possible to carry out only the step S7, S10, S13 or S16 to set the clock control or, to carry out only the step S8, S11, S14 or S17 to set the frequency deviation amplitude (width) control, when determining the frequency deviation data operation parameters depending on the absolute value D.

After the frequency deviation data operation parameters are determined depending on the absolute value D, the DSP 40 calculates the standard value of the frequency deviation data based on the detected data and the notification information regarding the input detection from the CPU 34 in a step S618. In addition, a step S619 obtains the frequency deviation curve calculation data based on the formula (4) described above using the frequency deviation data operation parameters obtained by the above described process, with respect to the calculated standard frequency deviation data.

When the frequency deviation curve calculation data is obtained, a step S620 outputs an operation clock signal of the D/A converter 50. Then, a step S621 decides whether or not the counting operation of the address counter 32a has ended. If the decision result in the step S621 is NO, the process returns to the step S618 so as to calculate the standard frequency deviation data. On the other hand, the process returns to the step S1 if the decision result in the step S621 is YES, so as to start the operation of detecting the edge of the modulated data.

According to this embodiment, it is possible to judge the frequency deviation in real-time by carrying out the process directly with respect to the input modulated data, because the DSP 40 carries out a frequency deviation judging process in real-time. Moreover, this embodiment can improve the leakage power to the adjacent channel and the demodulation condition by outputting the optimum frequency deviation for each frequency deviation. Further, this embodiment can simplify the circuit construction because the standard frequency deviation curve is calculated by the DSP 40. Moreover, even in the case of the multiple-value (or multi-level value) frequency deviation, it is possible to obtain the above described effects by use of a circuit similar to that described above by adding a port to the CPU 34.

Although each of the embodiments described above uses the DSP as the signal controller 40, the signal controller 40 is of course not limited to the DSP, and any suitable means may be used to provide the functions of the signal controller 40.

Further, the present invention is not limited to these embodiments, but various variations and modifications may be made without departing from the scope of the present invention.

What is claimed is:

1. A modulation system comprising:
   a data analyzer detecting input of a modulated data and a modulation clock signal and latching and detecting an edge of the modulated data, in response to the modulated data and the modulation clock signal;
   a signal controller, responsive to an output of said data analyzer, carrying out an operation process with respect to the frequency deviation data and carrying out one of a frequency deviation amplitude control operation and a frequency deviation time control operation;
   a digital-to-analog converter converting an output of said signal controller into an analog signal; and
   a transmitting unit transmitting an output of said digital-to-analog converter.

2. The modulation system as claimed in claim 1, wherein:
said data analyzer comprises:
   a detector latching and detecting an edge of the modulated data; and
   an analyzer including an address counter which outputs an address with respect to said signal controller, and a memory which stores a standard frequency deviation data,
and said signal controller comprises:
   a digital signal processor carrying out a predetermined frequency deviation width control operation or frequency deviation time control operation with respect to the standard frequency deviation data output from said memory.

3. The modulation system as claimed in claim 1, wherein:
said data analyzer comprises:
   a detector latching and detecting an edge of the modulated data; and
   a memory storing a standard frequency deviation data,
and said signal controller comprises:
   a digital signal processor carrying out a predetermined frequency deviation width control operation or frequency deviation time control operation with respect to the standard frequency deviation data output from said memory.

4. The modulation system as claimed in claim 1, wherein:
said data analyzer comprises:
   a detector latching and detecting an edge of the modulated data;
and said signal controller comprises:
   a digital signal processor including means for comparing a modulated data previously latched by said detector and a modulated data presently latched by said detector, means for creating a standard frequency deviation data depending on a comparison result of the modulated data, and means for carrying out a predetermined frequency deviation width control operation or frequency deviation time control with respect to the created standard frequency deviation data.

5. The modulation system as claimed in claim 1, wherein:
said data analyzer comprises:
   a central processing unit including an internal memory storing the modulated data which is read,
and said signal controller comprises:
   a digital signal processor including means for comparing a modulated data previously stored in said central processing unit and a modulated data presently stored in said central processing unit, means for creating a standard frequency deviation data depending on a comparison result of the modulated data, and means for carrying out a predetermined frequency deviation width control operation or frequency deviation time control with respect to the created standard frequency deviation data.

6. The modulation system as claimed in claim 5, wherein:
said central processing unit further includes means for storing the previous modulated data and the present modulated data, and means for comparing the previous modulated data and the present modulated data, and said digital signal processor creates the standard frequency deviation data depending on the comparison result of the modulated data and carries out the predetermined frequency deviation width control operation or frequency deviation time control with respect to the created standard frequency deviation data in real-time.

7. The modulation system as claimed in claim 2, wherein said digital signal processor makes a judgement related to a direction, time and frequency width of the frequency deviation in response to the output of said data analyzer.

8. The modulation system as claimed in claim 3, wherein said digital signal processor makes a judgement related to a direction, time and frequency width of the frequency deviation in response to the output of said data analyzer.

9. The modulation system as claimed in claim 4, wherein said digital signal processor makes a judgement related to a direction, time and frequency width of the frequency deviation in response to the output of said data analyer.

10. The modulation system as claimed in claim 5, wherein said digital signal processor makes a judgement related to a direction, time and frequency width of the frequency deviation in response to the output of said data analyzer.

* * * * *